(12) United States Patent
Wolf

(10) Patent No.: US 6,226,113 B1
(45) Date of Patent: May 1, 2001

(54) COHERENCE FILTERS AND SYSTEMS UTILIZING SAME

(75) Inventor: Emil Wolf, Rochester, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 08/851,602

(22) Filed: May 5, 1997

(51) Int. Cl.$^7$ .............................. H04B 10/04; H04B 10/06
(52) U.S. Cl. .................... 359/154; 359/180; 359/193; 359/885
(58) Field of Search ................................. 359/130, 129, 359/131, 154, 885, 193, 180

(56) References Cited

U.S. PATENT DOCUMENTS

| | | | | |
|---|---|---|---|---|
| 3,719,127 | * | 3/1973 | Mueller ............................... | 95/12.2 |
| 3,947,123 | * | 3/1976 | Carlson et al. ...................... | 356/39 |
| 5,282,115 | * | 1/1994 | McGuire .............................. | 362/2 |
| 5,812,318 | * | 9/1998 | Babbitt et al. ...................... | 359/559 |

OTHER PUBLICATIONS

Wolf, E. and James, D. F. V., "Correlation–induced spectral changes", 1996, Rep. Progr. Phys. 59, 771.
Bennett, C. H., Brassard. G. and Ekert, A. K., "Quantum cryptography", 1992, Sci. Am. 257, 50.
Beran, M. J. and Parrent, Jr., G. B., "Imaging of partially coherent light", 1964, Theory of Partial Coherence (Prentice–Hall:London).
Bertolotti, M., Scudieri, F. and Verginelli, S., "Spatial coherence of light scattered by media with large correlation length of refractive index fluctuations", 1976, Appl. Opt. 15, 1842.
Chrien, T. G., Morris and G. M., "Optical crytography using a multifaceted reference–beam hologram", App. Opt. 24, 933.

Courjon, D., Bulabois, J. and Carter, W. H., "Use of a holographic filter to modify the coherence of a light field", 1981, J. Opt. Soc. Amer. 71, 469.
De Santis, P., Gori, F., Guattari, G. and Palma, C., "An example of a Collett–Wolf source", 1979, Opt. Commun. 29, 256.
De Santis, P., Gori, F., Guattari, G. and Palma, C., "Synthesis of partially coherent fields", 1986, J. Opt. Soc. Amer. A3, 1258.
Deschamps, J., Courjon, D. and Bulabois, J., "Gaussian Schell–model sources: an example and some perspectives", 1983, J. Opt. Soc. Amer. 73, 256.
Farina, J. D., Narducci, L. M. and Collett, E., "Generation of highly directional beams from a globally incoherent source", 1980, Opt. Commun. 32, 203.
Faklis, D. and Morris, G. M., "Spectral shifts produced by source correlations", 1988, Opt. Lett. 13, 4.
Faklis, D. and Morris, G. M., "Generation of a class of partially coherent sources with controlled correlation", 1992, J. Mod. Opt. 39, 941.
Goodman, J. W., "Coherence of optical waves", 1985, Statisical Optics (John Wiley & Sons: New York).
Indebetouw, G., "Synthesis of polychromatic light sources with arbitrary degrees of coherence: some experiments", 1989, J. Mod. Opt. 36, 251.
Kandpal, H. C., Vaishya, J. S. and Joshi, K. C., "Correlation–induced spectral shifts in optical measurements", 1994, Opt. Eng. 33, 1996.

(List continued on next page.)

Primary Examiner—Leslie Pascal
(74) Attorney, Agent, or Firm—Martin Lukacher; Kenneth J. Lukacher

(57) ABSTRACT

Optical filters and filter systems operate in accordance with correlation-induced spectral changes and are applied for spectral line resolution in spectrometry, for optical data processing and for cryptography, as by having prescribed filtering properties in different directions of observation.

33 Claims, 13 Drawing Sheets

OTHER PUBLICATIONS

Kunzig, R., "The Wolf effect", 1988, Discover magazine Aug., 18.

Mandel, L. and Wolf, E., "Radiation from sources of any state of coherence", 1995, Optical Coherence and Quantum Optics (Cambridge University Press: Cambridge).

Martienssen, W. and Spiller, E., "Coherence and fluctuations in light beams", 1964, Am. J. Phys. 32, 919.

Morris, G. M and Faklis, D., "Effects of source correlation on the spectrum of light", 1987, Opt. Commun. 62, 5.

Morris, G. M. and Zweig, D. A., "Achromatic fourier transform systems", 1987, Optical Signal Processing, ed. J. L. Horner (Academic Press: New York), 23.

Ohtsuka, Y., "Modulation effects of a soundwave on the mutual coherence function of light", 1976, Opt. Commun. 17, 234.

Ohtsuka, Y., "Modulation of optical coherence by ultrasonic waves", 1986, J. Opt. Soc. Amer. A3, 1247.

Scudieri, F., Bertolotti, M. and Bartolini, R., "Light scattered by a liquid crystal: A new quasi-thermal source", 1974, Appl. Opt. 13, 181.

Shirai, T. and Asakura, T., "Spatial coherence of light generated from a partially coherent source and its control using a source filter", 1993, Optik 94, 1.

Shirai, T., Wolf, E., Chen, H. and Wang, W., "Coherence filters and their uses part II: one-dimensional realizations", 1998, J. Mod. Opt. 45, 799.

Shirai, T. and Asakura, T., "Spectral changes of light and scattering phenomena", 1996, Opt. Rev. 3, 1.

Starikov, A. and Wolf, E., "Coherent-mode representation of Gaussian Schell-model sources and of their radiation fields", 1982, J. Opt. Soc. Am. 72, 923.

Tervonen, E., Friberg, A. T. and Turnen, J., "Gaussian Schell-model beams generated with synthetic acousto-optic holograms", 1992, J. Opt. Soc. Amer. 9, 796.

Turunen, J., Tervonen, E. and Friberg, A. T., "Acousto-optic control and modulation of optical coherence by electronically synthesized holographic gratings", 1990, J. Appl. Phys. 67, 49.

Wolf, E., "Invariance of the spectrum of light on propagation", 1986, Phys. Rev. Lett.56, 1370.

Wolf, E., "Non-cosmological redshifts of spectral lines", 1987, Nature 326, 363.

Wolf, E. Shirai, T., Chen, H. and Wang, W., "Coherence filters and their uses part I: Basic theory and examples", 1997, J. Mod. Opt. 44, 1345.

Wolf, E., "Spectral invariance and non-invariance of light generated by partially coherent sources", 1995, Appl. Phys. B60, 303.

Yatagai, T., Kawai, S. and Huang, H., "Optical computing and interconnects", 1996, Proc. IEEE 84, 828.

Idebetouw, G., "Synthesis of Polychromtic Light Sources with Arbitrary Degrees of Coherence. Some Experiments", Journal of Modern Optics vol. 36, No. 2, pp. 251–259, 1989.*

Morris et al., "Effects of Source Correlation on the Spectrum of Light", Optics Communication, vol. 62, No. 1, pp. 5–11, Apr. 1, 1997.*

* cited by examiner

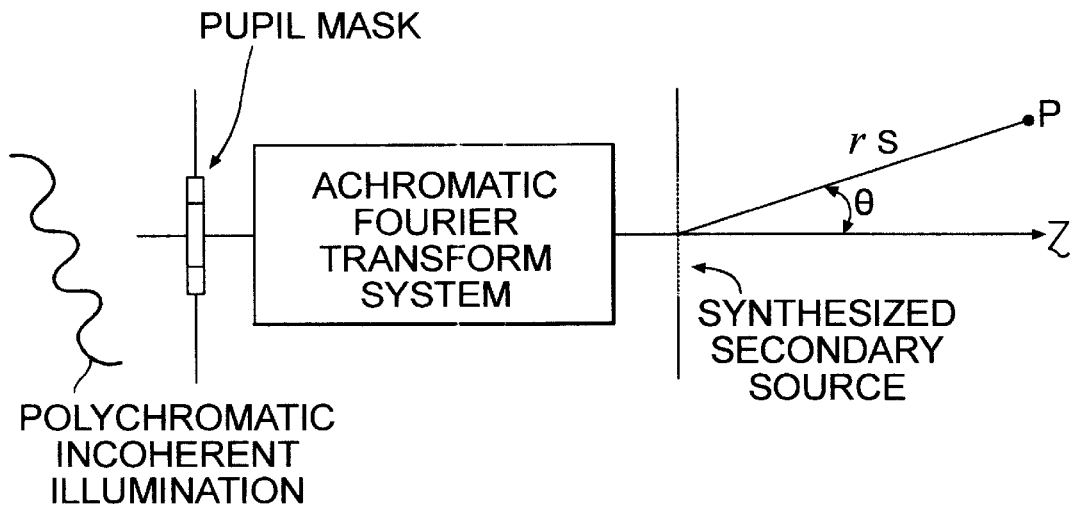
FIG. 7
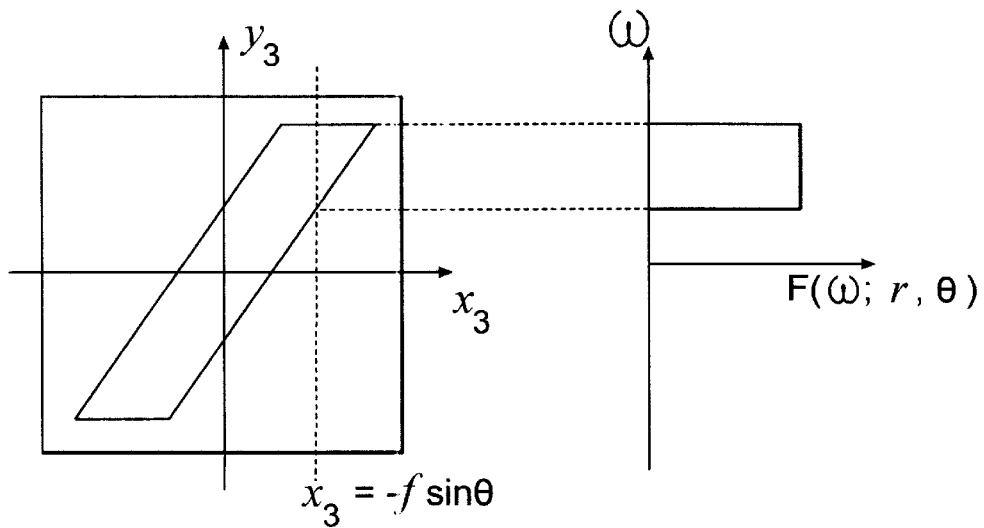
FIG. 10(a)   FIG. 10(b)

COHERENCE FILTERS AND SYSTEMS UTILIZING SAME

DESCRIPTION

The present invention relates to filters which operate on the spatial coherence properties of radiation and which are referred to herein as coherence filters. The filters provided by the invention operate on the principle that if a source of radiation has a broad spectrum, such as is the case with many optical sources, the spectrum of the light generated by the source changes as it propagates away from it.

The invention provides a system for spatially modifying the field spectrum by controlling spatial coherence of the source spectrum. Filters provided by the invention are therefore called spatial coherence filters. Transmission properties of the filters depend upon the spatial coherence imposed upon the source spectrum, and the transmission properties determine the spectrum which is filtered both temporally and spatially (as in different directions of observation).

It has been discovered and shown experimentally that the spectrum of radiation emitted by a steady state source depends not only on the spectrum of the source but also on its coherence properties. The spectrum, for example, of light emitted by a source may change significantly on propagation, even in free space. The discovery was reported in Wolf, E.,1986 *Phys. Rev. Lett.* 56, 1370 and has been mentioned, for example in *Discovery Magazine*, for August 1988 and experimental verification of the discovery was also reported in Wolf, E. and James, D. F. V., 1996 *Rep. Progr. Phys.* 59, 771 and Mandel, L. and Wolf, E., 1995, Optical Coherence and Quantum Optics (Cambridge University Press).

The present invention enables correlation-induced spectral changes to be used to produce new types of radiation filters, which might be called spatial-coherence spectral filters (to be occasionally abbreviated as SCSF). Such filters have several properties that are not possessed by conventional filters. Coherence filters in accordance with the invention are obtained because of the discovery that by controlling the spectral degree of coherence of light transmitted via a transmission control system without changing the spectrum of the light in the transmission control system, different filtering properties or characteristics can be provided which manifest themselves in the radiation propagated from the transmission system. The filtering effect is observed in the far field for example, (Franhoffer region), but the distance from the system may be reduced by optical transformation, (e.g. Fourier transformation), using a lens. The filters can, for example, have different prescribed filtering properties in different directions of observation. SCSF, for example may be applied in astronomy (in the search for particular spectral lines) or in optical computing (to develop spectrum-selective optical interconnects). Another area of SCSF applications is cryptography.

Accordingly, it is the principal object of the invention to provide improved systems for filtering radiation using prescribed spatial coherence effects.

It is a further object of the invention to provide improved optical filters and operative in accordance with the principles of spatial coherence (SCSF).

It is a still further object of the invention to provide systems applying SCSF's for applications including spectrometry, optical data processing and cryptography.

The foregoing and other objects, features and advantages of the invention will become more apparent from the following detailed description of the theoretical bases of the invention and presently preferred embodiments thereof and from the accompanying drawings which are briefly described below.

The cut-off frequency $\omega_c = \omega_1/\sin\theta$.

Figure 3:
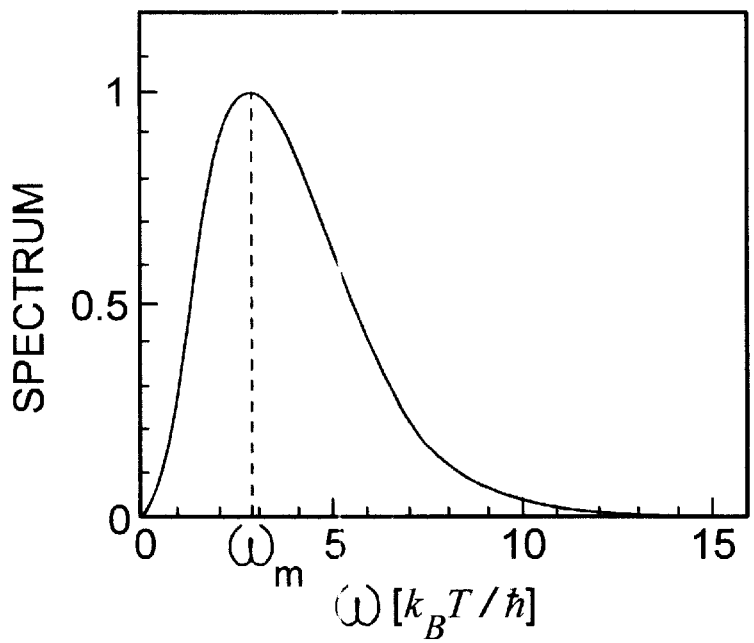

FIG. 3 is a plot of the Planck spectrum (normalized to unity at its maximum).

Figure 4A:
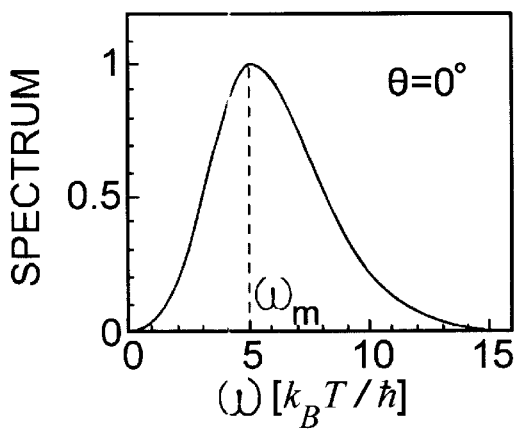
Figure 4B:
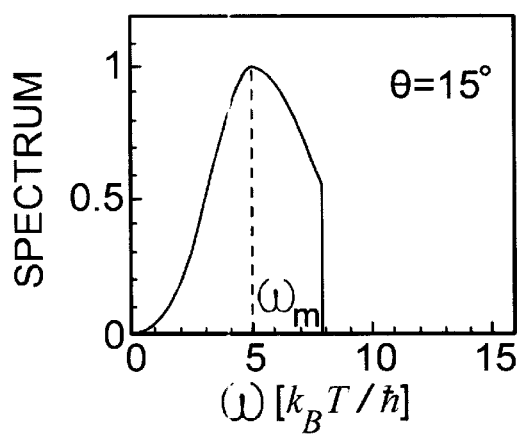
Figure 4C:
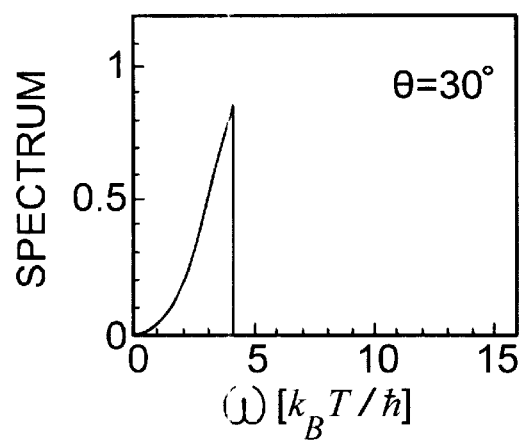

FIGS. 4(a) to (c) are spectra obtained in different directions of observation $\theta$, from the Planck spectrum (shown in FIG. 3), with non-uniform low-pass coherence filter whose spectral degree of coherence is given by the Besinc function (3.1), with $k_1 = 2k_B T/hc$.

Figure 5:
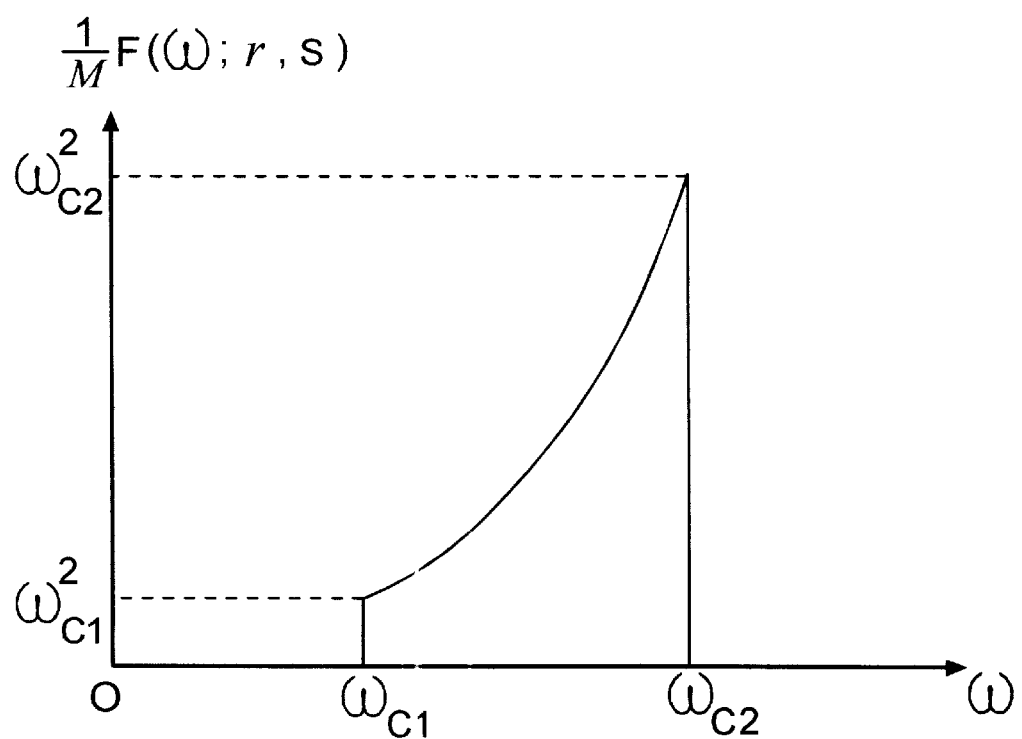

FIG. 5 is a plot of the filter function (3.10) produced by a source with spectral degree of coherence given by the expression (3.8). The normalization constant $$M = \frac{A}{\pi(\omega_2^2 - \omega_1^2)}\left(\frac{\cos\theta}{r}\right)^2.$$

The cut-off frequencies $\omega_{c1} = \omega_1/\sin\theta$, $\omega_{c2} = \omega_2/\sin\theta$, ($\omega_2 > \omega_1$).

Figure 6A:
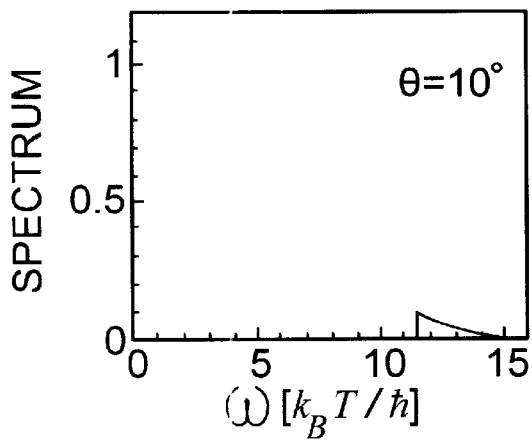
Figure 6B:
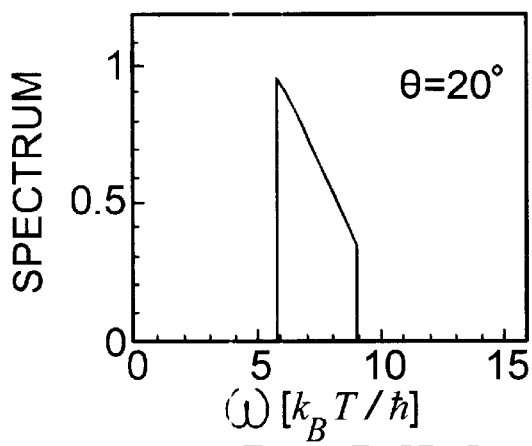
Figure 6C:
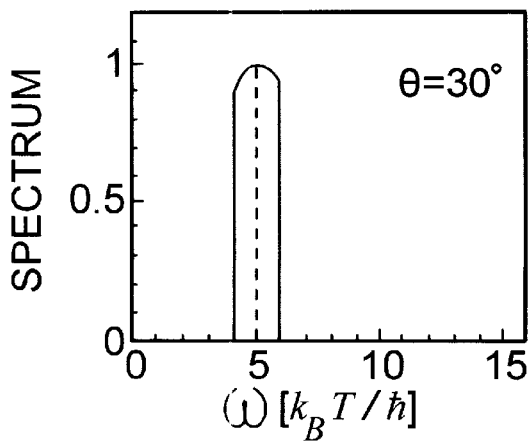

FIGS. 6(a) to (c) are plots of spectra obtained in different directions of observation from the Planck spectrum (shown in FIG. 3), with non-uniform band-pass coherence filter whose spectral degree of coherence is given by Eq. (3.8), with $k_1 = 2k_B T/hc$ and $k_2 = 3k_B T/hc$.

FIG. 7 is a simplified schematic diagram illustrating the use of an achromatic Fourier transform system to generate synthesized secondary sources whose spectral degree of coherence are given by Eqs. (3.1) and (3.8).

Figure 7A:
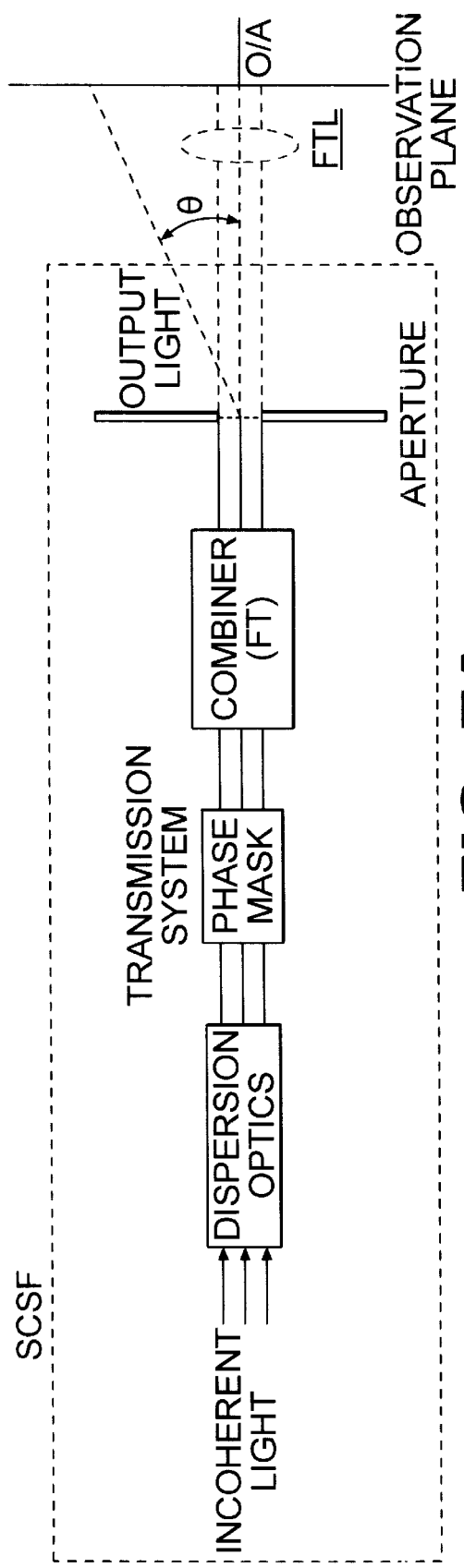
Figure 7B:
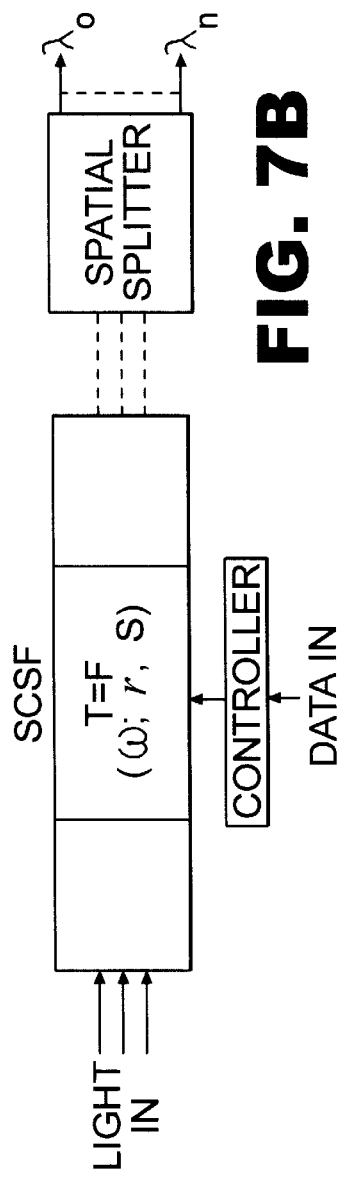
Figure 7C:
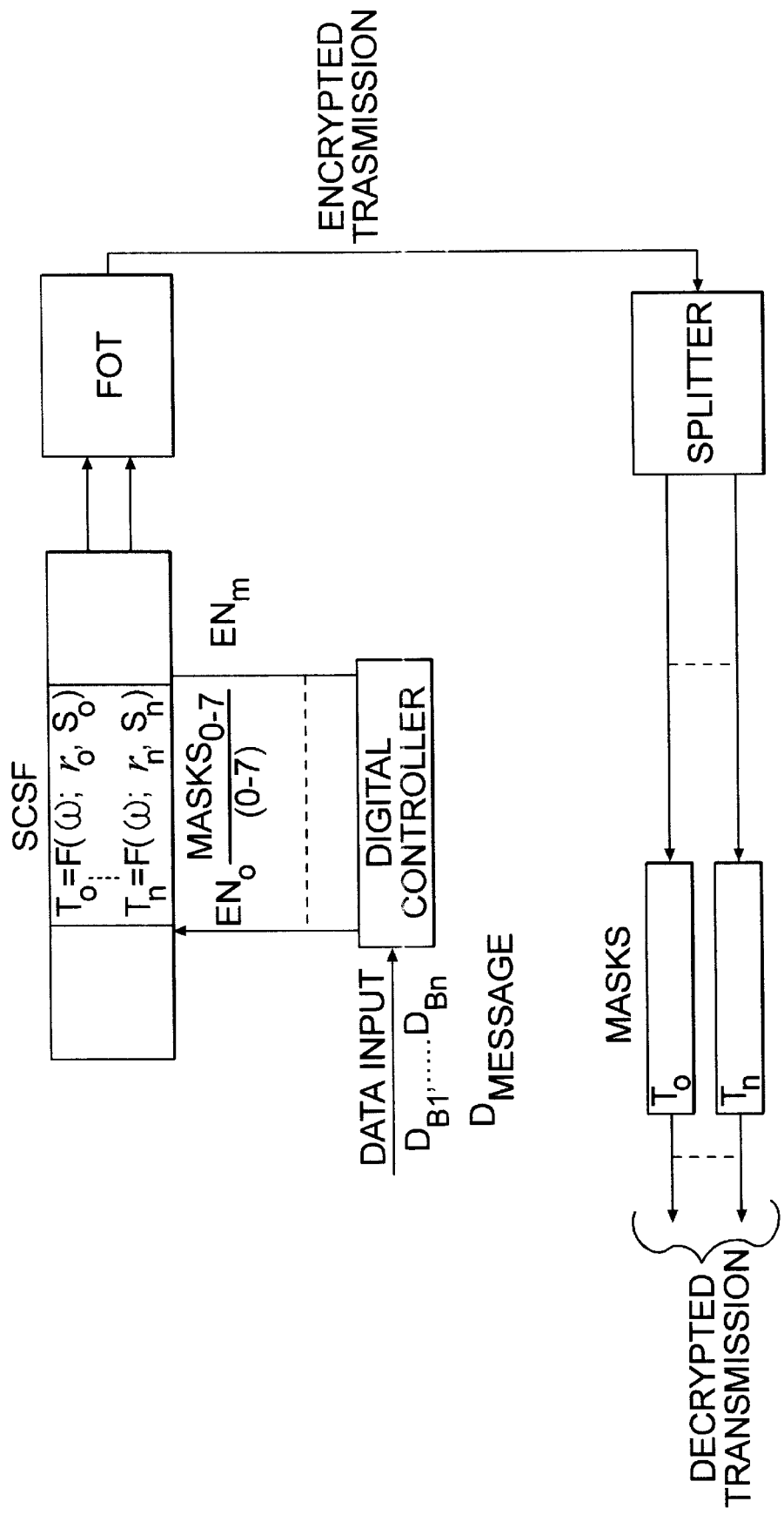

FIGS. 7(a) to (c) are block diagrams of other SCSF systems according to the invention.

Figure 8:
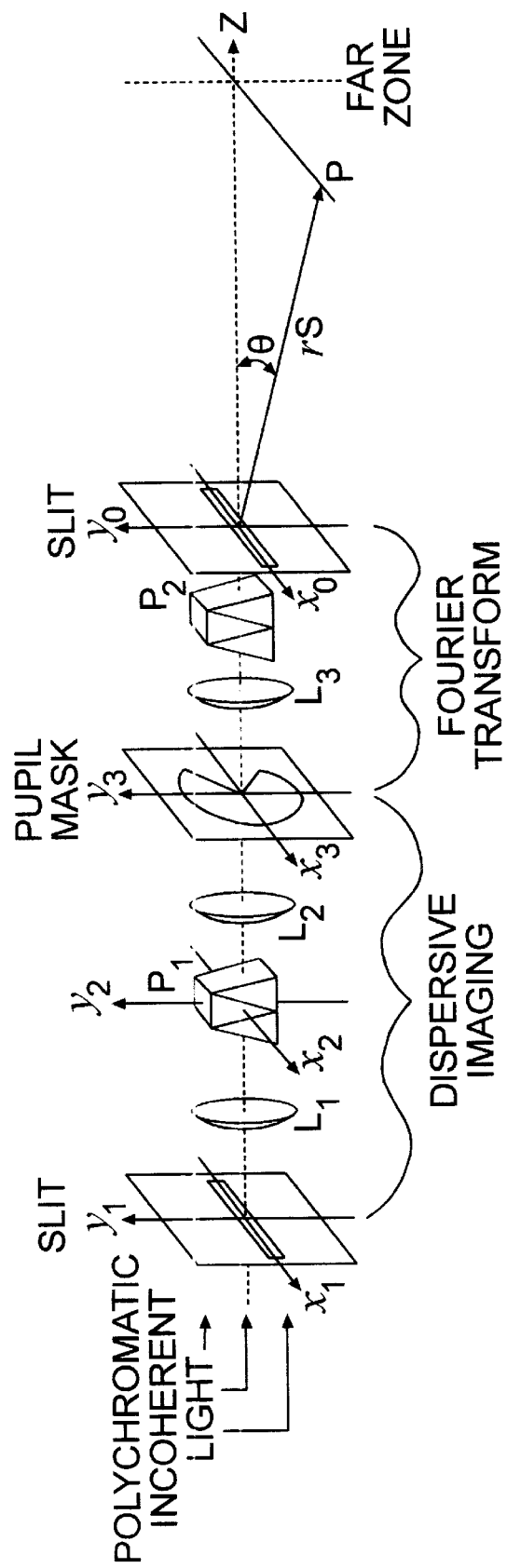

FIG. 8 is a schematic diagram of an SCSF which implements the system shown in FIG. 7A.

FIGS. 9(a) to (d) are views perpendicular to the direction of light transmission along the optical axis of the system of FIG. 8 showing the pupil masks. The pupil masks (a) and (b) satisfy the constraint of Eq.(4) while (c) and (d) violate it. The types of (c) and (d) were originally considered in FIG. 7.

Figure 9A:
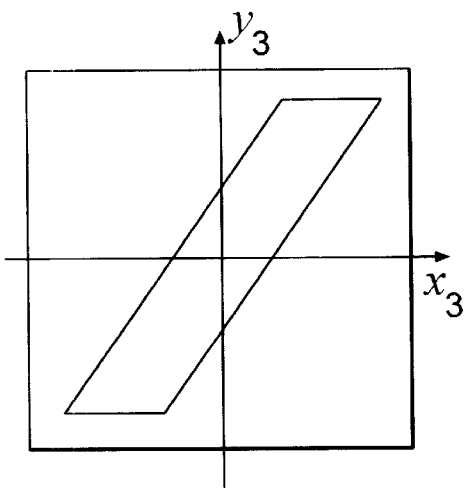
Figure 9B:
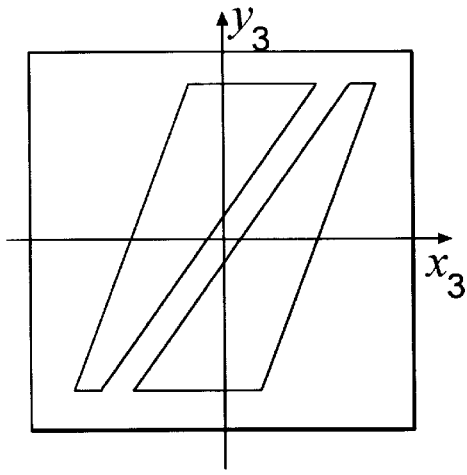
Figure 9C:
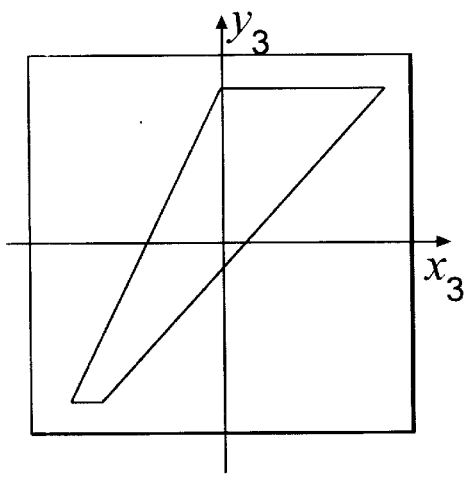
Figure 9D:
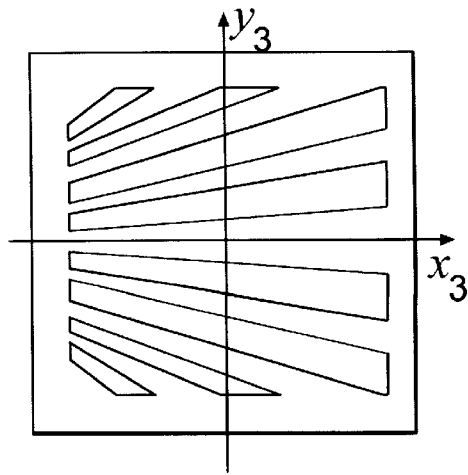

FIGS. 10(a) and (b) are diagrams of the mask of FIG. 9(a) and FIG. 10(b), is the filter function obtained from the pupil mask of FIG. 9(a).

Figure 11A:
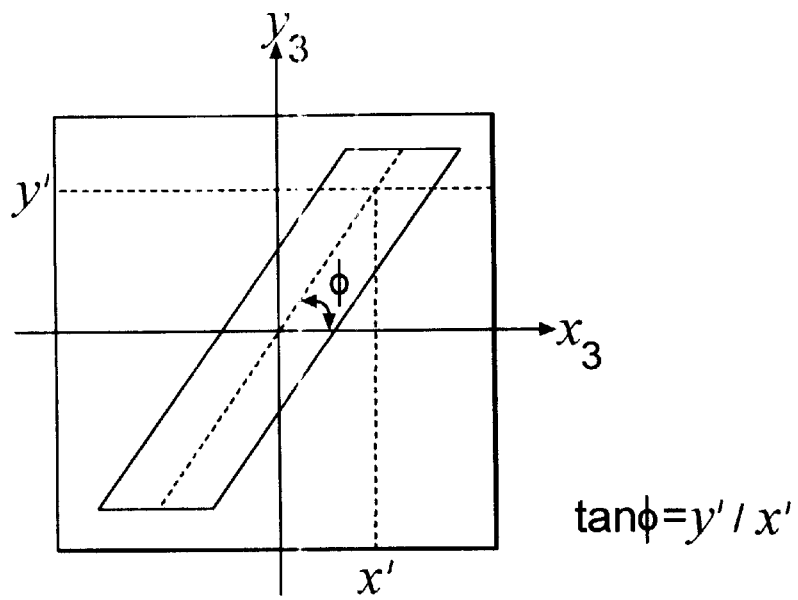
Figure 11B:
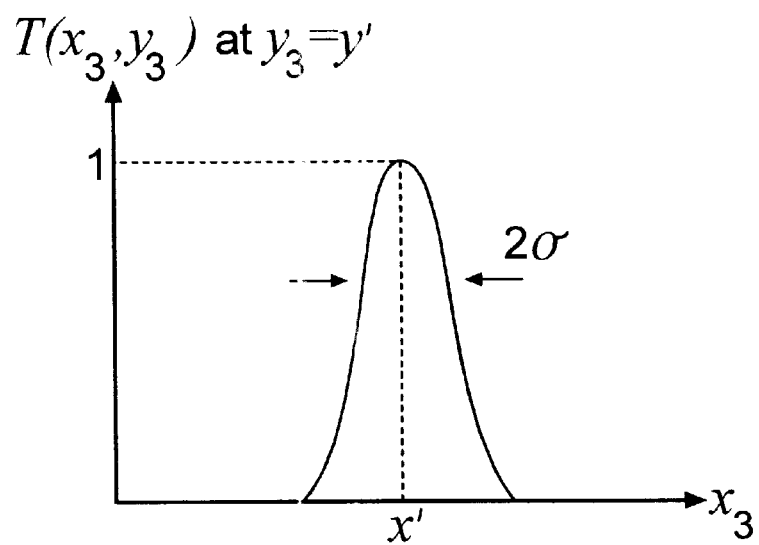

FIGS. 11(a) and (b) shows the pupil mask of FIG. 9(a) and its amplitude transmission function in FIG. 11(b).

Figure 12:
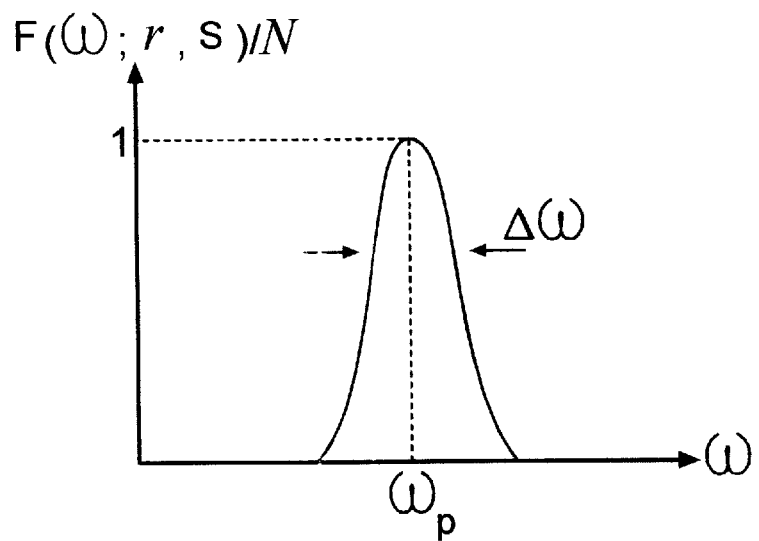

FIG. 12 is a plot of the normalized filter function of a coherence filter with the pupil mask depicted in FIG. 11a. The effective width $\Delta\omega = \sqrt{2}(\sigma/\alpha)\tan\phi$, the peak frequency $\omega_p = \omega_0 - (f/\alpha)\tan\phi \sin\theta$, and the normalization constant $N = Lf\cos^2\theta/Cr$.

Figure 13A:
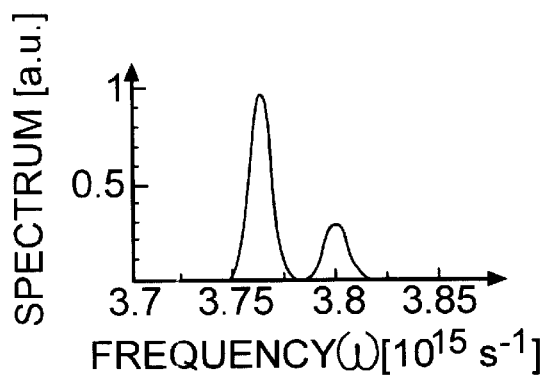
Figure 13B:
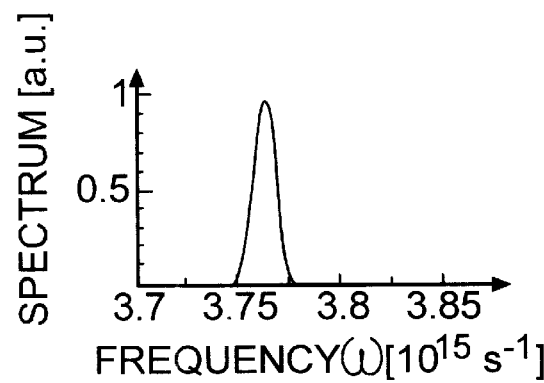
Figure 13C:
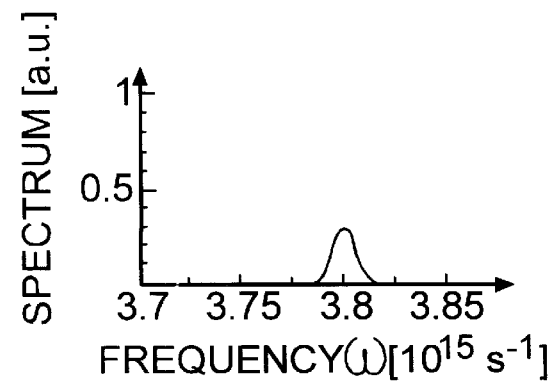

FIGS. 13(a) to (c) are plots illustrating spatial separation of two neighboring spectral lines by using a SCSF, an original spectrum being shown in FIG. 13(a) and spectra observed in different directions of observation in FIGS. 13(b) and (c).

Figure 14:
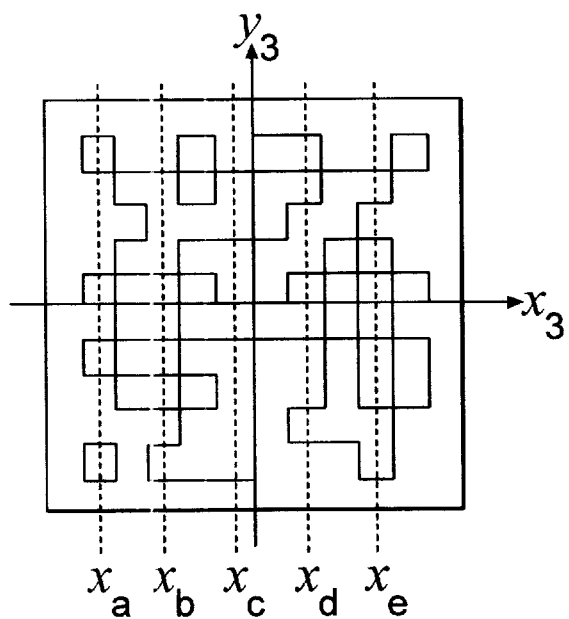

FIG. 14 is a view like FIG. 9 but shown as a random checkerboard-like pupil mask for encryption purposes.

Figure 15:
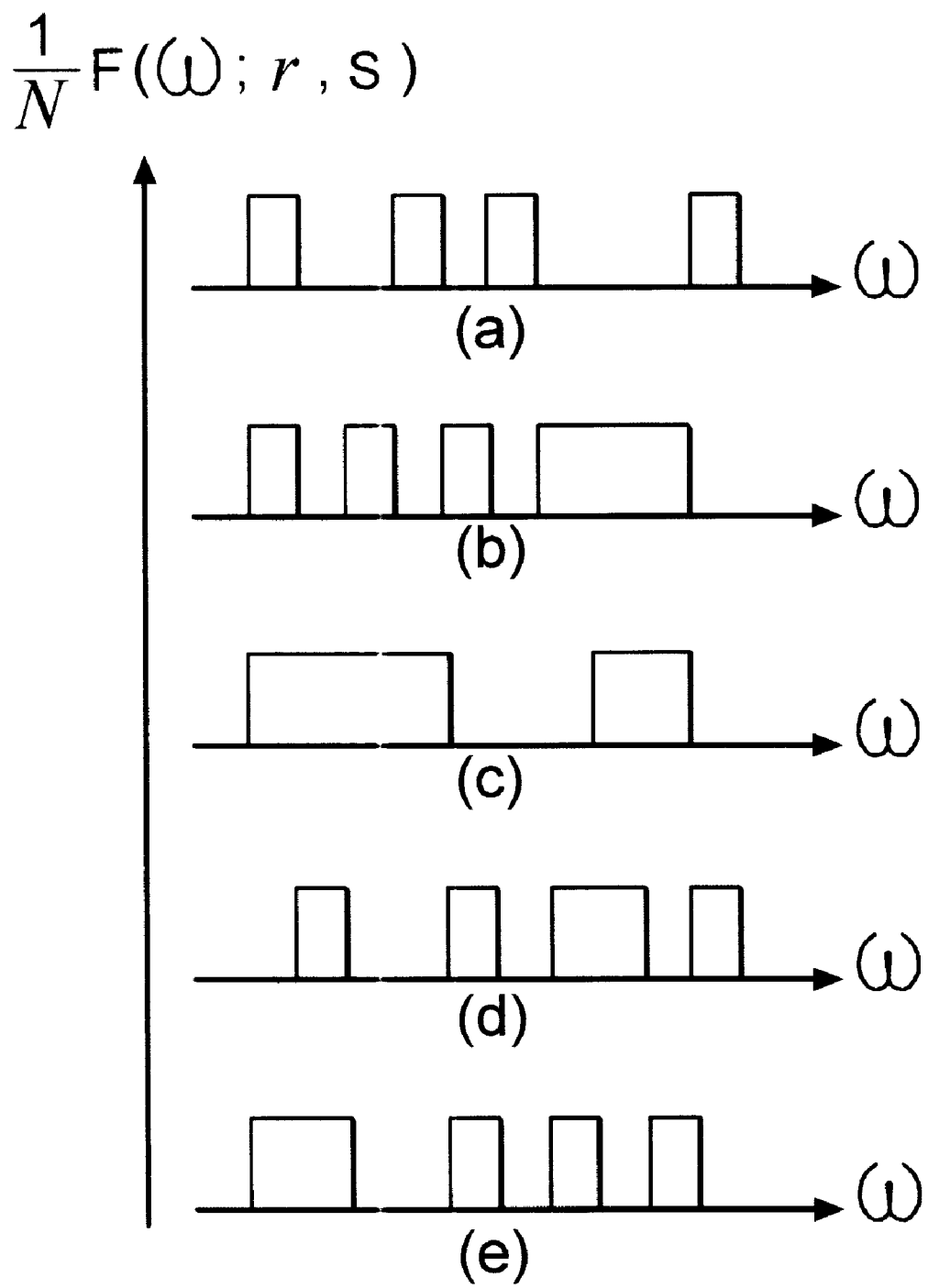

FIG. 15 are transmission versus frequency of the coherence filter with the the pupil mask depicted in FIG. 14. The filter functions are plotted for several angles θ of observation: $\theta=-\sin^{-1}(x_a/f)$ in (a), $-\sin^{-1}(x_b/f)$ in (b), $-\sin^{-1}(x_c/f)$ in (c), $-\sin^{-1}(x_d/f)$ in (d), and $-\sin^{-1}(x_e/f)$ in (e), f being the focal length of the lens $L_3$.

Consider first the spectral degree of coherence of a source as a filter function. Suppose that a secondary source occupies a finite domain D of the plane z=0 and radiates into the half-space z>0. Let $S^{(0)}(\rho,\omega)$ be the spectral density at a source point specified by position vector ρ and let $\mu^{(0)}(\rho_1,\rho_2,\omega)$ be the spectral degree of coherence at source points specified by position vectors $\rho_1$ and $\rho_2$, with ω denoting the frequency (see FIG. 1).

We assume that the source is quasi-homogeneous. For sources of this class, which are frequently encountered in nature or are produced in a laboratory, the spectral degree of coherence depends on $\rho_1$ and $\rho_2$ only through the difference $\rho'=\rho_2-\rho_1$. We will write in this case $g^{(0)}$ instead of $\mu^{(0)}$, i.e. we now have $$\mu^{(0)}(\rho_1,\rho_2,\omega)=g^{(0)}(\rho_2-\rho_1,\omega). \tag{2.1}$$

Further, for such a source, the spectral density $S^{(0)}(\rho,\omega)$ at each frequency ω varies much more slowly with ρ than $|g^{(0)}(\rho',\omega)|$ varies with ρ'.

The spectral density of the field generated by the source at a point P, specified by a position vector r=rs ($s^2$=1) in the far zone, is given by the expression (see Mandel, L. and Wolf, E., 1995, Optical Coherence and Quantum Optics (Cambridge University Press)., p. 319, Eq. (5.8–34)).

$$S^{(\infty)}(rs, \omega) = \left(\frac{2\pi k}{r}\right)^2 \tilde{S}^{(0)}(0, \omega)\tilde{g}^{(0)}(ks_\perp, \omega)\cos^2\theta, \tag{2.2}$$

where $$k=\omega/c \tag{2.3}$$

c being the speed of light, $$\tilde{S}^{(0)}(0, \omega) = \frac{1}{(2\pi)^2}\int_D S^{(0)}(\rho, \omega)d^2\rho \tag{2.4}$$

and $\tilde{g}^{(0)}(f,\omega)$ is the two-dimensional spatial Fourier transform of $g^{(0)}(\rho',\omega)$ i.e.

$$\tilde{g}^{(0)}(f, \omega) = \frac{1}{(2\pi)^2}\int g^{(0)}(\rho', \omega)e^{-if\cdot\rho'}d^2\rho'. \tag{2.5}$$

Figure 1:
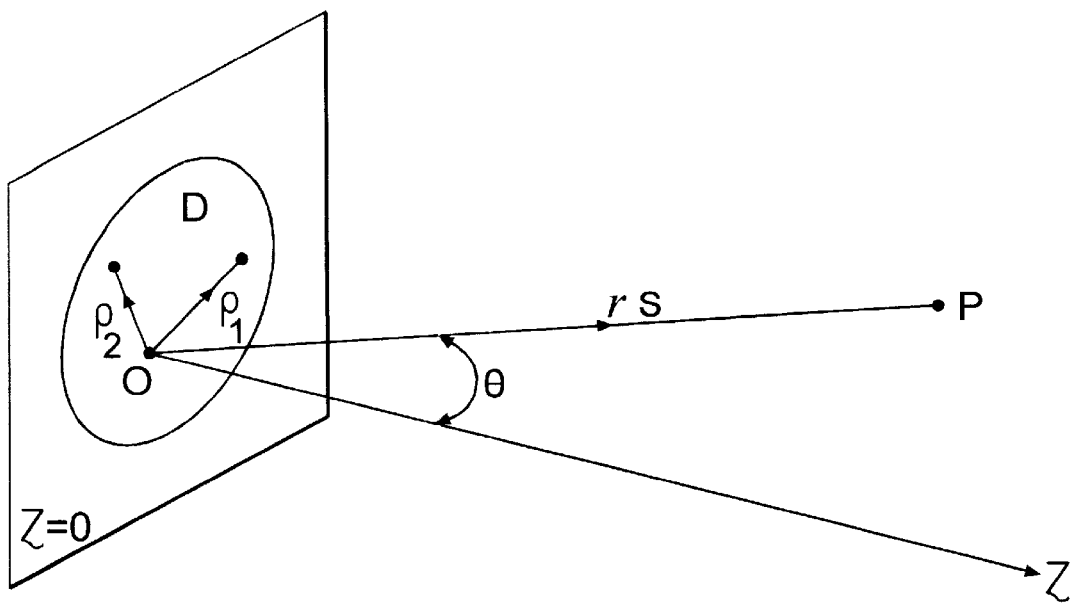
FIG. 1 is a perspective view of the domain of a source of radiation, illustrating the notation used in the equations in the specification.

Further $s_\perp$ denotes the projection, considered as a two-dimensional vector, of the unit vector s onto the source plane and θ is the angle which the unit vector s makes with the positive z direction (see FIG. 1).

Suppose now the spectrum of the source is the same at every source point, i.e. that $$S^{(0)}(\rho,\omega)=S^{(0)}(\omega) \tag{2.6}$$

Then Eq. (2.4) gives $$\tilde{S}^{(0)}(0, \omega) = \frac{A}{(2\pi)^2}S^{(0)}(\omega), \tag{2.7}$$

where A is the area of the source domain D. On substituting from Eq. (2.7) into Eq. (2.2) and making use of Eq. (2.3) we obtain for the far-field spectrum the expression $$S^{(\infty)}(rs, \omega) = \frac{A\omega^2}{c^2r^2}\tilde{g}^{(0)}(ks_\perp, \omega)S^{(0)}(\omega)\cos^2\theta. \tag{2.8}$$

To see some implications of Eq. (2.8) we re-write it in the form $$S^{(\infty)}(rs,\omega)=F(\omega;r,s)S^{(0)}(\omega), \tag{2.9}$$

where $$F(\omega; r, s) = \frac{A\omega^2}{c^2r^2}\tilde{g}^{(0)}(ks_\perp, \omega)\cos^2\theta. \tag{2.10}$$

The formula (2.9) shows that the function F(ω;r,s) acts as a linear filter, changing the source spectrum $S^{(0)}(\omega)$ into a different spectrum, $S^{(\infty)}(rs,\omega)$ of the radiated field in the far zone. For this reason we may refer to the function F(ω;r,s) as the filter function of the source. Equation (2.10) shows that this function depends on the two-dimensional spatial Fourier transform $\tilde{g}^{(0)}$ of the spectral degree of coherence of the source and the direction of observation (via the factor $\cos^2\theta$ and the argument $s_\perp$ of $\tilde{g}^{(0)}$). Consider also that it is the normalized source spectrum $$S^{(0)}(\rho, \omega) = S^{(0)}(\rho, \omega) \bigg/ \int_0^\infty S^{(0)}(\rho, \omega)d\omega$$

rather than the source spectrum $S^{(0)}(\rho,\omega)$ itself which is the same at each source point, i. e. $S^{(0)}(\rho,\omega)=S^{(0)}(\omega)$. Straightforward calculations then lead to the result that the formula (2.8) for the far field spectrum applies, provided the source area A on the right-hand side of Eq. (2.8) is replaced by the factor $$\tilde{I}^{(0)}(0) = \int_D I^{(0)}(\rho)d^2\rho,$$

where $$I^{(0)}(\rho) = \int_0^\infty S^{(0)}(\rho, \omega)d\omega$$

represents the intensity at the source point ρ.

However, the spectral degree of coherence is controlled by a transmission system. If the spectrum is changed upon transmission through the system the filtering properties due to the filter function are not obtained. The transmission properties of an exemplary transmission system (see Wolf, E. and James, D. F. V., 1996 *Rep. Progr. Phys.* 59, 771 and Indebetouw, G., 1989, *J. Mod. Opt.* 36, 251) are discussed below to illustrate that the spectrum, particularly the spectral density, must be substantially unchanged during transmission of the light subject to spatial coherence control in the transmission system. The filtering effect is due to the spectral degree of coherence as shown by the following example. Consider non-uniform low-pass filters where light is from a source which has a spectral degree of coherence given by a "Besinc" function viz., $$g^{(0)}(\rho', \omega) = \frac{2J_1(k_1\rho')}{k_1\rho'}, \quad (3.1)$$

($\rho'=|\rho'|=|\rho'_2-\rho'_1|$), where $J_1$ is the Bessel function of the first kind and first order and $k_1$ is a positive constant, with dimensions of inverse length. The two-dimensional spatial Fourier transform, defined by Eq. (2.5), of the function (3.1) is given by the expression in (3.2) (obtained as per Appendix B of Wolf, E., 1995, *Appl. Phys.* B60, 303)

$$\tilde{g}^{(0)}(f, \omega) = \frac{1}{\pi k_1^2} \quad \text{when } f < k_1$$
$$= \frac{1}{2\pi k_1^2} \quad \text{when } f = k_1 \quad (3.2)$$
$$= 0 \quad \text{when } f > k_1,$$

where $f=|f|$. Since $\tilde{g}^{(0)}(f,\omega)$ depends on f only through the magnitude $|f|$ of $f$, $\tilde{g}^{(0)}(ks_\perp,\omega)$, will depend on $s_\perp$ only through the magnitude $|s_\perp|$, which is (see FIG. 1)

$$|s_\perp| = \sqrt{1-s_z^2} = \sqrt{1-\cos^2\theta} = \sin\theta. \quad (3.3)$$

On substituting from Eq. (3.2) into the formula (2.10) and using the relations (3.3) and (2.3) we find that, in this case, the filter function is given by the expression $$F(\omega; r, s) = \frac{A}{\pi r^2}\left(\frac{\omega}{\omega_1}\right)^2 \cos^2\theta \quad \text{when } \omega < \frac{\omega_1}{\sin\theta}$$
$$= \frac{A}{2\pi r^2}\left(\frac{\omega}{\omega_1}\right)^2 \cos^2\theta \quad \text{when } \omega = \frac{\omega_1}{\sin\theta} \quad (3.4)$$
$$= 0 \quad \text{when } \omega > \frac{\omega_1}{\sin\theta},$$

where $$\omega_1 = k_1 c. \quad (3.5)$$

Figure 2:
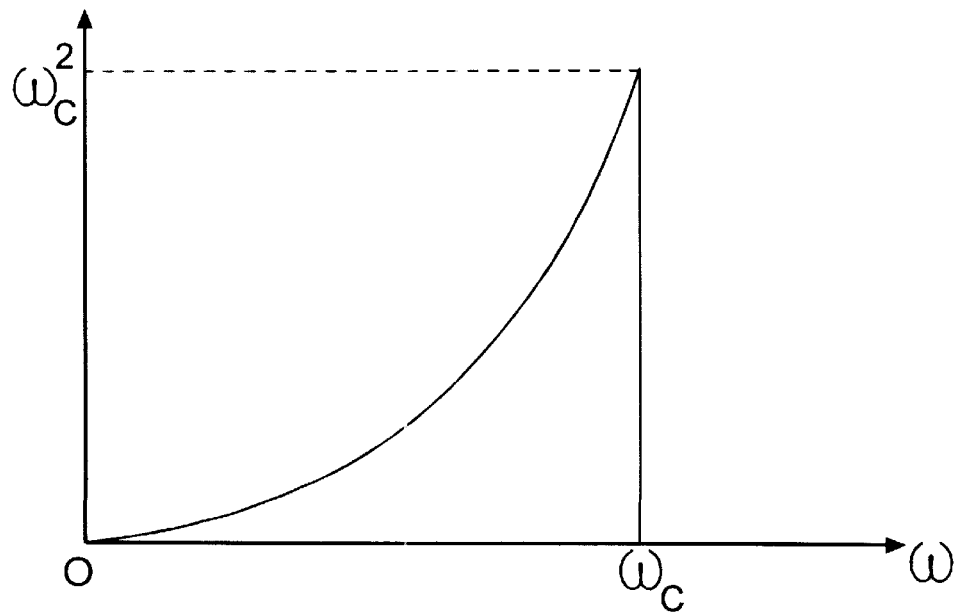
FIG. 2 is a plot of the filter function [Eq. (3.4)] produced by a Besinc correlated source [Eq. (3.1)], for a fixed direction $\theta$ of observation. The normalization constant $$N = \frac{A}{\pi \omega_1^2}\left(\frac{\cos\theta}{r}\right)^2.$$

The behavior of the filter function (3.4), for a fixed direction of observation $\theta$, is shown in FIG. 2. We see that in this case the correlation properties of the source give rise to a non-uniform low-pass filter, with the cut-off frequency $$\omega_c = \frac{\omega_1}{\sin\theta}. \quad (3.6)$$

Since $\omega_c$ depends on $\theta$, such filters provide simple examples that, in general, SCSFs have different filtering properties in different directions of observation.

The above results are illustrated in FIGS. 3 and 4, for radiation from a planar, secondary, quasi-homogeneous source with the Planck spectrum (FIG. 3).

$$S^{(0)}(\omega) = \frac{\hbar\omega^3}{\pi^2 c^3} \frac{1}{e^{\hbar\omega/k_B T} - 1} \quad (3.7)$$

where $\hbar=h/2\pi$, h being the Planck constant, $k_B$ the Boltzman constant, and T is the absolute temperature. FIG. 4 shows the far-zone spectra which would be observed in directions $\theta=0$, 15° and 30°, with the use of a non-uniform low-pass filters produced by the Besinc spectral degree of coherence (3.1).

Next consider non-uniform band-pass filters where the light is from a source whose spectral degree of coherence is given by the expression $$g^{(0)}(\rho', \omega) = \frac{1}{k_2^2 - k_1^2}\left\{k_2^2\left[\frac{2J_1(k_2\rho')}{k_2\rho'}\right] - k_1^2\left[\frac{2J_1(k_1\rho')}{k_1\rho'}\right]\right\}, \quad (3.8)$$

with $k_1$ and $k_2$ being positive constants and $k_2>k_1$. Since $g^{(0)}$ is now a simple linear combination of expressions of the form (3.1), we can at once make use of the expression (3.2) for the Fourier transform of the Besinc function and we find, after a straightforward calculation, that in the present case $$\tilde{g}^{(0)}(f, \omega) = 0 \quad \text{when } f < k_1$$
$$= \frac{1}{\pi(k_2^2 - k_1^2)} \quad \text{when } k_1 < f < k_2 \quad (3.9a)$$
$$= 0 \quad \text{when } f > k_2$$

In the limiting cases when either $k_1$ or $k_2$ are equal to f one finds that $$\tilde{g}^{(0)}(f, \omega) = \frac{1}{2\pi(k_2^2 - k_1^2)} \quad \text{when } f = k_1 \text{ or } f = k_2. \quad (3.9b)$$

On substituting from Eqs. (3.9) into the expression (2.10) and using a similar argument as before on going from Eq. (3.2) to (3.4) we obtain the following expressions for the filter function associated with a source whose spectral degree of coherence is given by the expression (3.8):

$$F(\omega; r, s) = 0 \quad \text{when } \omega < \frac{\omega_1}{\sin\theta}$$
$$= \frac{A}{\pi r^2} \frac{\omega^2}{\omega_2^2 - \omega_1^2} \cos^2\theta \quad \text{when } \frac{\omega_1}{\sin\theta} < \omega < \frac{\omega_2}{\sin\theta} \quad (3.10a)$$
$$= 0 \quad \text{when } \omega > \frac{\omega_2}{\sin\theta},$$

where $$\omega_1 = k_1 c, \ \omega_2 = k_2 c. \quad (3.11)$$

Further $$F(\omega; r, s) = \frac{A\omega^2}{2\pi r^2(\omega_2^2 - \omega_1^2)} \cos^2\theta \quad (3.10b)$$
$$\text{when } \omega = \frac{\omega_1}{\sin\theta} \text{ or } \omega = \frac{\omega_2}{\sin\theta}.$$

The behavior of this filter function is shown in FIG. 5. We see that in this case one has a linear filter which acts as a non-uniform band-pass filter with the pass-band $$\frac{\omega_1}{\sin\theta} \leq \omega \leq \frac{\omega_2}{\sin\theta}. \quad (3.12)$$

The cut-off frequencies $$\omega_{c1} = \frac{\omega_1}{\sin\theta}, \ \omega_{c2} = \frac{\omega_2}{\sin\theta} \quad (3.13)$$

depend again on the angle of observation $\theta$.

The effect of such a non-uniform band-pass filter on radiation from the same source as considered as above, again with Planck's spectrum (see FIG. 3), is illustrated in FIG. 6.

The present invention enables use to be made of the effect of the spectral degree of coherence of a source acting as a linear filter, which changes the source spectrum into a different spectrum in the far field by providing a system which will modify the degree of coherence of a given source in a prescribed way and thus give rise to a filter with desired filtering properties. Generally the types of coherence filters that we have just discussed can be realized by the use of a pupil mask and an achromatic Fourier transform lens systems (FIG. 7). It was shown in Morris, G. M. and Faklis, D., 1987, *Opt. Commun.* 62, 5 that with a circular aperture placed in the input plane, the spectral degree of coherence of the synthesized source has exactly the Besinc form (3.1), appropriate to a non-uniform low-pass filter. If, on the other hand, an annular aperture is placed in the input plane, the spectral degree of coherence of the synthesized source may readily be shown to be given by the expression (3.8), appropriate to a non-uniform band-pass filter.

Basically, the SCSF system is a transmission control system with a mask to control the degree of spatial coherence and implement equation (2.9). Such a system may include dispersive optics, the mask and combining optics which together provide the spatial coherence generated by the mask and also substantially the same spectral density of the input and output light from the SCSF See FIG. 7A. The spectrum is filtered and different wavelength components according to the filter characteristics appear at different spatial positions (in different directions of propagation θ as measured from an optical axis (O/A) through the center of the output operture. A Fourier transform lens (FTL) may optionally be used to reduce the distance from the output aperture of the SCSF to the observation plane.

A spatial splitter, for example optical fibers to pick up light from different directions of observation in the observation plane in the farfield may be used to provide spectrum selective interconnections for use in optical computing. There input data operates a digital controller which selects masks of different degrees of spatial cohence corresponding to the computational process reflected by the data, as shown in FIG. 7B. FIG. 7C shows a cryptography system where the key is a complement of masks, each with a different degree of spatial coherence $T_o$ to $T_n$ is selected by the digital controller. The encrypted output may be transmitted by a fiber optic transmission line FOT) with a bundle of filters, each of which picks up light at a different location in the observation plane. A second complement of like masks $T_o$ to $T_n$ may be used for decryption.

Alternatively to the masks, passing the light through a rotating glass plate with a rough surface, whose random height variations have appropriate correlation properties may be used (Martienssen, W. and Spiller, E., 1964, *Am. J. Phys.* 32, 919, de Santes, P., Gori, F., Guattari, G., and Palma, C., 1979, *Opt. Commun.* 29, 256, Farina, J. D., Narducci, L. M., and Collett, E., 1980, *Opt. Commun.* 32, 203). Light may be transmitted through a liquid crystal whose correlation properties can be modified by applying to it an electric d.c. field (Scudieri, F., Bertolotti, M., and Bartolini, R., 1974, *Appl. Opt.* 13, 181, Bertolotti, M., Scudieri, F. and Verginelli, S., 1976, *Appl. Opt.* 15, 1842.); or passing it through a beam of ultrasonic waves (see, for example, Ohtsuka, Y., 1976, *Opt. Commun.* 17, 234., Ohtsuka, Y., 1986, *J. Opt. Soc. Amer.* A3, 1247). Synthetic acousto-optic holograms may also be used (Turunen, J., Tervonen, E., and Friberg, A. T., 1990, *J. Appl. Phys.* 67, 49., Tervonen, E., Friberg, A. T. and Turnen, I., 1992, *J. Opt. Soc. Amer.* 9, 796). Other alternatives to masks make use of holographic filters (Couton, D., Bulabois, J. and Carter, W. H., 1981, *J. Opt. Soc. Amer.* 71, 469), lensless feedback systems (Deschamps, J., Courjon, D., and Bulabois, J., 1983, *J. Opt. Soc. Amer.* 73, 256), or source filters (Shirai, T. and Asakura, T., 1993, *Optik* 94, 1). Synthesis of partially coherent fields from initially incoherent and coherent sources was described in De Santis, P., Gori, F., Guattari, G. and Palma, C., 1986, *J. Opt. Soc. Amer.* A 3, 1258.

A passive optical system shown in Indebetouw, G., 1989, *J. Mod. Opt.* 36, 251 is particularly useful when the improvement provided by this invention are incorporated.

FIG. 8 shows a schematic diagram of the Indebetouw system. For convenience, this system may be considered as consisting of two parts: the first part is a dispersive imaging system, while the other part is a Fourier transform system with phase compensation. These two parts are connected in series along an optical axis, z. A pupil mask is inserted between the two parts, at right angles to the axis.

The system acts in the following way: polychromatic, spatially incoherent light is incident on a thin slit in the input plane $(x_1, y_1)$ from the left. The spectral density of the light is the same at every point of the slit. The slit is imaged by a two-lens a focal system (lenses $L_1$, $L_2$, each with focal lengths f) onto the pupil mask in the $(x_3, y_3)$-plane. This imaging system contains a prism $P_1$ in the $(x_2, y_2)$-plane and, therefore, the resultant images of the slit are spectrally dispersed along the $y_3$-direction. We may therefore call this part of the system a dispersive imaging system. The pupil mask located in the $(x_3, y_3)$-plane changes the intensity distribution of each slit image. By the actions of a Fourier lens $L_3$ (focal length f) and another prism $P_2$ which is located at the back focal plane of the lens $L_3$ just in front of the output $(x_0, y_0)$-plane, polychromatic partially coherent field with uniform spectral density is produced in the $(x_0, y_0)$-plane. Here the role of the prism $P_2$, which is identical to the prism $P_1$, is to eliminate the phase change arising from the spatial dispersion of the slit images on the pupil mask. The spectral degree of coherence of the light in the output plane is uniquely determined by the transmission function of the pupil mask. This is basically a consequence of the van Cittert-Zernike theorem ([See Mandel, L. and Wolf, E., 1995, *Optical Coherence and Quantum Optics* (Cambridge University Press, Cambridge England], Sec.4.4.4).

It follows from the detailed calculation given in Appendix A below that the cross-spectral density of light at two points $\rho_0$ and $\rho'_0$ in the output plane [i.e., the $(x_0, y_0)$-plane] is given by the expression $$W^{(0)}(\rho_0, \rho'_0, \omega) = \frac{1}{(2\pi f)^2} S^{(1)}(\omega) \int_{-\infty}^{\infty} |T(x_3, \xi(\omega))|^2 \exp\left[-i\frac{k}{f}(x'_0 - x_0)x_3\right] dx_3, \quad (4.1)$$

where $\rho_0 = (x_0, y_0)$, $\rho'_0 = (x'_0, y'_0)$, I is a positive constant, $S^{(1)}(\omega)$ is the spectral density, assumed to be independent of position, of the polychromatic light incident on the slit in the input plane, T is the amplitude transmission function of the pupil mask and $k = \omega/c$ is the wave number associated with the frequency ω, c being the speed of light in vacuum. The function $\xi(\omega)$ in the arguments of the transmission function T characterizes the action of the first prism; more specifically it represents the magnitude of the shift of the slit image, at frequency ω, along the $y_3$-direction. It may be readily shown from Eq.(2.1) that the spectral degree of coherence (see Mandel, L. and Wolf, E. (1995)-supra, Sec.4.3.2) and the spectral density of the light in the output plane $(x_0, y_0)$ are given by the expression in Eq. (4.2)

$$\mu^{(0)}(\rho_0, \rho'_0, \omega) = \frac{\int_{-\infty}^{\infty} |T(x_3, \xi(\omega))|^2 \exp\left[-i\frac{k}{f}(x'_0 - x_0)x_3\right] dx_3}{\int_{-\infty}^{\infty} |T(x_3, \xi(\omega))|^2 dx_3} \quad (4.2)$$

and $$S^{(0)}(\rho_0, \omega) = \frac{I}{(2\pi f)^2} S^{(1)}(\omega) \int_{-\infty}^{\infty} |T(x_3, \xi, (\omega))|^2 dx_3, \quad (4.3)$$

respectively. It is important to note that these expressions have no $y_0$-dependence. For this reason we may introduce a slit aperture along the $x_0$-direction in the $(x_0, y_0)$-plane, as shown in FIG. 8, with no appreciable effect. This slit aperture is introduced from the basic requirement that the spectrum of the light in the output aperture should, in principle, be the same as in the input aperture.

We see from Eq.(4.2) that the spectral degree of coherence of the light along the $x_0$-direction in the $(x_0, y_0)$-plane is proportional to the Fourier transform of the squared modulus of the transmission function of the pupil mask$_1$ which modulates the dispersive images of the slit in the $(x_3, y_3)$-plane. This feature of the system has the important consequence that an appropriate choice of the pupil mask may produce a prescribed one-dimensional spectral degree of coherence of light in the output plane. The resultant field in the output plane is statistically homogeneous along the $x_0$-direction in the sense that its spectral degree of coherence depends on $x_0$ and $x'_0$ only through the difference $|x_0-x'_0|$. However, Eq.(4.3) shows that, in general, as the spectral degree of coherence is changed, the spectral density of light in the output plane is also changed, depending on the transmission function T of the pupil mask. The Indebetouw system does not act as a coherence filter because such a filter should change only the spectral degree of coherence of the transmitted light and not its spectrum on propagation to the $(x_0, y_0)$-plane. It has been discovered, in accordance with the invention, that the spectrum of the light should be substantially unchanged on transmission through the system. The system will then act as a (one-dimensional) coherence filter. This can be achieved by constraining the integral on the right-hand side of Eq. (4.3) to have a constant value C, i.e., one imposes on the transmission function the constraint that $$\int_{-\infty}^{\infty} |T(x, y)|^2 dx = C, \quad (5.1)$$

for all values of y. The spectral degree of coherence, [Eq.(4.2)], and the spectral density, [Eq.(4.3)], of light in the output plane $(x_0, y_0)$ are then given by the expressions $$\mu^{(0)}(\rho_0, \rho'_0, \omega) = \frac{1}{C} \int_{-\infty}^{\infty} |T(x_3, \xi, (\omega))|^2 \exp\left[-i\frac{k}{f}(x'_0 - x_0)x_3\right] dx_3 \quad (5.2)$$

and $$S^{(0)}(\rho_0, \omega) = \frac{IC}{(2\pi f)^2} S^{(1)}(\omega) \equiv S^{(0)}(\omega), \quad (5.3)$$

respectively. The symbol I in Eq.(5.3) represents a positive constant which is the same as that contained in Eqs.(4.1) and (4.3). Equation (5.3) shows that the spectral density of the transmitted light is indeed the same at each point of the output plane and is equal to the spectral density of the light entering the system, apart from a multiplicative constant factor.

Using the constraint imposed by Eq. (5.1), if the pupil mask is uniformly illuminated, the integrated intensity along the x-direction just behind the pupil mask has a constant value, irrespective of the vertical distance y. In the special case when the pupil mask has binary transmittance, such as zero (i.e., opaque strip) and unity (i.e., freely transmitting strip), the constraint can be provided when the total width of openings across the pupil mask along the x-direction is the same for all values of y. The masks shown in FIG. 9 exhibit this constraint. In other words these filter masks obey the constraint indicated by Eq.(5.1).

Consider the filter function of the system. It has been shown above in connection with Eqs. (2.9) and (2.10) that a coherence filter acts as a linear filter, changing the spectrum in the output plane into a different spectrum in the far zone of the output slit. We now examine the filter function of the coherence filter produced by the system shown in FIG. 8.

Because of the presence of the slit aperture in the output plane (see FIG. 8), the field produced in this plane may be regarded as a one-dimensional secondary source. The spectral density of light produced by such a source at point P, which is situated in the far zone of the source at a point specified by the position vector r=rs, ($s^2=1$), is given by the expression, derived in Appendix B of Starikov, A., Wolf, E., 1982, *J. Opt. Soc. Am.* 72, 923, $$S^{(\infty)}(rs, \omega) = \quad (5.4)$$

$$\left(\frac{k}{2\pi r}\right) \cos^2\theta \int_{-\infty}^{\infty}\int_{-\infty}^{\infty} W^{(0)}(x_0, x'_0, \omega) \exp[-ik\sin\theta(x'_0 - x_0)] dx_0 dx'_0,$$

where $\theta$ is the angle that the unit vector s makes with the positive z-direction in the $(x_0, z)$-plane. Substituting from the right-hand side of Eq.(4.1) into Eq.(5.4) and performing the integration one readily finds, using Eq.(5.3), that in this context, the cross-spectral density $W^{(0)}(\rho_0, \rho'_0, \omega)$, given by Eq.(4.1), should be understood to be a function of $x_0$ and $x'_0$, rather than $\rho_0$ and $\rho'_0$, because a slit aperture is placed in the $(x_0, y_0)$-plane along the $y_0$-direction. Thus, Eq.(4.1) may be directly substituted into Eq.(5.4). To perform the integration with respect to $x_0$ and $x'_0$, we first change the variables of integration from $x_0$ and $x'_0$ to $(x_0+x'_0)/2$ and $x'_0-x_0$, respectively, and find that $$S^{(\infty)}(rs, \omega) = \left[\frac{Lf}{Cr}|T(-f\sin\theta, \xi(\omega))|^2 \cos^2\theta\right] S^{(0)}(\omega), \quad (5.5)$$

where L denotes the width (along the $x_0$-direction) of the exit-slit aperture. In deriving Eq. (5.5) diffraction arising from the finite length of the slit along the $x_0$-direction has been neglected. We see from Eq.(5.5) that the filter function of this coherence filter is given by the expression $$F(\omega; r, s) = \frac{Lf}{Cr}|T(-f\sin\theta, \xi(\omega))|^2 \cos^2\theta. \quad (5.6)$$

This formula shows that, apart from simple geometrical factors, the filter function is equal to the squared modulus of the amplitude transmission function T of the pupil mask with appropriate arguments.

Equation Eq.(5.6) suggests a method of visualizing the filter function. The filter function for a specific angle $\theta$ which the unit vector s makes with the z-axis is given, apart from a multiplicative factor, by the square $|T(x, y)|^2$ of the transmission function of the pupil mask along the line $x_3=-f\sin\theta$ parallel to the $y_3$-direction, provided that the function $\xi(\omega)$ is a linear function of $\omega$ (i.e., by using the prism $P_1$ which disperses the light along the $y_3$-direction linearly with temporal frequency). Schematic diagram of this situation is shown in FIG. 10, where the pupil mask depicted in FIG. 9(a) is used, for an example. One can see that the pupil mask of this kind produces a band-pass spectral filter whose cut-off frequencies depend on the angle θ of observation.

Consider next a transmission system for producing achromatic coherence functions (for example as shown in FIG. 7 and the implementations in FIGS. 7(a) to (c). As shown above in connection with Eqs. (3.1) and (3.13) achromatic coherence functions (i.e., coherence functions which do not depend on the frequency of light) may generate either a low-pass or a band-pass filter. This may be seen from the spectral degree of coherence given by Eq.(5.2), which is generated by the transmission system and which depends necessarily on the frequency $\omega(=kc)$ through the k-dependence of the Fourier kernel, even though the transmission function $T(x, y)$ has no y-dependence. An example of a transmission having an achromatic coherence function is the situation where the one-lens Fourier transform system which is placed between the $(x_3, y_3)$-plane and the $(x_0, y_0)$-plane (see FIG. 8) is replaced with an achromatic Fourier transform system. In general, the achromatic Fourier transform system has several lenses by means of which the frequency-dependence of the Fourier transform is eliminated as, for example, shown in Morris, G. M., Zweig. D. A., 1987, in *Optical Signal Processing* (Academic Press: New York), 23–27.

Consider a embodiment of the system, with the one-lens Fourier transform system replaced by the achromatic Fourier transform system.

As shown in Appendix B below, the cross-spectral density of light reaching the output plane in such a system is given by the expression $$W^{(0)}(\rho_0, \rho_0', \omega) = \qquad (5.7)$$
$$I\left(\frac{\omega_0}{2\pi f}\right)^2 \frac{1}{\omega^2} (S)^{(1)}(\omega) \int_{-\infty}^{\infty} |T(x_3, \xi(\omega))|^2 \exp\left[-i\frac{k_0}{f}(x_0' - x_0)\right] dx_3.$$

Here $k_0 = \omega_0/c$ is a positive constant corresponding to the wave number associated with a particular (constant) design frequency $\omega_0$. Using Eq.(5.7) the spectral degree of coherence and the spectral density of the light in the output plane are found to be given by the expressions $$\mu^{(0)}(\rho_0, \rho_0', \omega) = \frac{\int_{-\infty}^{\infty} |T(x_3, \xi(\omega))|^2 \exp\left[-i\frac{k_0}{f}(x_0' - x_0)x_3\right] dx_3}{\int_{-\infty}^{\infty} |T(x_3, \xi(\omega))|^2 dx_3} \qquad (5.8)$$

and $$S^{(0)}(\rho_0, \omega) = I\left(\frac{\omega_0}{2\pi f}\right)^2 \frac{1}{\omega^2} S^{(1)}(\omega) \int_{-\infty}^{\infty} |T(x_3, \xi, (\omega))|^2 dx_3, \qquad (5.9)$$

respectively. Equation (5.8) shows that the spectral degree of coherence of the light in the output plane is indeed independent of the frequency ω in the sense that the Fourier kernel of Eq.(5.8) has no k-dependence. Consequently the optical arrangement of this type generates achromatic coherence functions, provided that the effect of the function $\xi(\omega)$ which appears in the argument of the transmission function T is appropriately removed. However, it follows from Eq. (5.9) that the spectral density of light is generally changed on transmission through this modified system, mainly because of the multiplicative $1/\omega^2$ factor on the right-hand side of Eq.(5.9). This factor causes a distortion of the spectrum as the light propagates through the system. Unless such a frequency-dependent factor is suppressed, this optical system is not a true coherence filter.

This problem may be readily overcome as follows. Suppose that the transmission function $T(x_3, y_3)$ of the pupil mask has a factorized form, i.e., is of the form $$T(x_3, y_3) = T_x(x_3) T_y(y_3), \qquad (5.10)$$

with $T_x$ and $T_y$ being arbitrary non-negative functions of $x_3$ and $y_3$, respectively. On substituting from Eq.(5.10) into Eq.(5.8), we find that $$\mu^{(0)}(\rho_0, \rho_0', \omega) = \frac{1}{C'} \int_{-\infty}^{\infty} |T_x(x_3)|^2 \exp\left[-i\frac{k_0}{f}(x_0' - x_0)x_3\right] dx_3 \qquad (5.11)$$

where $$C' = \int_{-\infty}^{\infty} |T_x(x_3)|^2 dx_3 \qquad (5.12)$$

is a positive constant. The spectral degree of coherence given by Eq.(5.11) is independent of the frequency ω of the light. On the other hand, substitution of Eq.(5.10) into Eq.(5.9) yields $$S^{(0)}(\rho_0, \omega) = IC'\left(\frac{\omega_0}{2\pi f}\right)^2 \frac{1}{\omega^2} S^{(1)}(\omega) |T_y(\xi(\omega))|^2. \qquad (5.13)$$

It follows from Eq.(5.13) that the frequency-dependent factors in Eq.(5.13) will be suppressed if the amplitude transmission function $T_y$ is given by the expression $$|T_y(y_3)| = A\xi^{-1}(y_3) \qquad (5.14)$$

with A being a positive constant and $\xi^{-1}$ being the inverse of the function $\xi$. To suppress the frequency-dependence of Eq.(5.13), the term $|T_y(\xi(\omega))|^2/\omega^2$ on the right-hand side of the equation should be a constant. Thus, for this purpose, one imposes the condition $$\frac{1}{\omega}|T_y(\xi(\omega))| = A,$$

where A is a positive constant. By setting $\xi(\omega) = y_3$, one readily finds that this equation is equivalent to Eq.(5.14). It then follows that $$S^{(0)}(\rho_0, \omega) = IC'A^2\left(\frac{\omega_0}{2\pi f}\right)^2 S^{(1)}(\omega) \equiv S^{(0)}_{achr}(\omega). \qquad (5.15)$$

Equation (5.15) shows that the spectral density of light remains indeed unchanged on propagation through this system, apart from a multiplicative constant factor. Relations (5.10) and (5.14) are constraints on the transmission function to ensure spectral invariance on propagation through this modified system.

Similarly as in connection with the derivation of Eq.(5.5), we find on substituting from Eq.(5.7) into Eq. (5.4), with the constraints indicated by Eqs. (5.10) and (5.14) that $$S^{(\infty)}(rs, \omega) = F_{achr}(\omega; r, s) \cdot S_{achr}^{(0)}(\omega), \qquad (5.16)$$

where the spectral density $S_{achr}^{(0)}(\omega)$ of light in the exit aperture of this system is given by Eq.(5.15) and the filter function is given by the expression $$F_{achr}(\omega; r, s) = \frac{Lf\omega}{C'r\omega_0}\left|T_x\left[-\left(\frac{\omega}{\omega_0}\right)f\sin\theta\right]\right|^2\cos^2\theta. \quad (5.17)$$

For an example, consider that the transmission function of the pupil mask along the $x_3$-direction is given by the expression $$T_x(x_3) = \begin{cases} 1 & \text{for } |x_3| \leq a, \\ 0 & \text{for } |x_3| > a, \end{cases} \quad (5.18)$$

with $a$ being a positive constant, while the transmission function along the $y_3$-direction is given by Eq.(5.14). The pupil mask of this type is depicted schematically in FIG. 10(*a*). On substituting from Eq.(5.18) into Eq.(5.17), we find that the filter function of this system is $$F_{achr}(\omega; r, s) = \begin{cases} \frac{Lf\omega}{C'r\omega_0}\cos^2\theta & \text{for } \omega \leq \frac{a\omega_0}{f|\sin\theta|}, \\ 0 & \text{for } \omega > \frac{a\omega_0}{f|\sin\theta|}. \end{cases} \quad (5.19)$$

The behavior of this filter function, for a fixed direction of observation $\theta$, is indicated in FIG. 10(*b*). It is seen that the modified system, with the pupil mask specified by Eqs. (5.14) and (5.18), acts as a non-uniform low-pass filter with the cut-off frequency $$\omega_c = \frac{a\omega_0}{f|\sin\theta|}. \quad (5.20)$$

The coherence filter of this kind may be regarded as a one-dimensional version of the non-uniform low-pass filters which we discussed above.

The compensation of the frequency-dependent factor appearing in Eq.(5.9), i.e., that of the $1/\omega^2$ factor in Eq.(5.7), may also be achieved by modifying the design rule of the Fourier achromat in the achromatic Fourier transform system in such a way that the system itself has an appropriate frequency dependence, to eliminate the unwanted frequency-dependent factors.

The pupil mask shown in FIG. 10 is useful for spatial separation of neighboring spectral lines and provides a coherence filter to separate spectral lines which are in close proximity of each other.

Consider a similar pupil mask, depicted in FIG. 11(*a*). The amplitude transmission function of the mask along the $x_3$-direction has a Gaussian form, with effective width $\sigma$, and with the position of the peak transmittance (assumed to be unity) along the line $y_3=(\tan\phi)\cdot x_3$. In this case, the amplitude transmission function of the pupil mask may be written in the form $$T(x_3, y_3) = \exp\left[-\frac{\{x_3 - (y_3/\tan\phi)\}^2}{2\sigma^2}\right]. \quad (6.1)$$

Suppose that the two prisms of $P_1$ and $P_2$ disperse light linearly with the frequency $\omega$ whilst the light at a particular frequency $\omega_0$ is not refracted. The function $\xi(\omega)$ which characterizes the performance of the prism then becomes $$\xi(\omega) = \alpha(\omega - \omega_0), \quad (6.2)$$

where $\alpha$ is a positive constant. On substituting from Eqs. (6.1) and (6.2) into Eq.(5.6), we obtain the following expression for the filter function of such a coherence filter:

$$F(\omega; r, s) = \frac{Lf}{Cr}\exp\left[-\frac{\left\{\omega - \omega_0 + \left(\frac{f}{\alpha}\right)\tan\phi\sin\theta\right\}^2}{\left(\frac{\sigma}{\alpha}\right)^2\tan^2\phi}\right]\cos^2\theta. \quad (6.3)$$

Here $\theta$ is the angle of observation, i.e., the angle which the unit vector s pointing towards the point of observation makes with positive z-direction. Equation (6.3) shows that the filter function now takes a Gaussian form with effective width $\Delta\omega = \sqrt{2}(\sigma/\alpha)\tan\theta$ and with the frequency of the peak transmission $$\omega_p = \omega_0 - \left(\frac{f}{\alpha}\right)\tan\phi\sin\theta. \quad (6.4)$$

The filter function represented by Eq.(5.3) is shown in FIG. 12.

Recalling that $\omega_0$, f, $\sigma$ and $\phi$ are all constants characterizing the performance of the coherence filter, we find from Eqs.(6.3) and (6.4) that this coherence filter acts as a band-pass spectral filter whose pass-band, which has a Gaussian profile with a fixed bandwidth, depends on the angle $\theta$ of observation. Hence if polychromatic incoherent light, having two neighboring spectral lines close to each other, is incident on this coherence filter, each spectral line will appear at a different angle of observation. Such coherence filters could therefore be used to separate spatially (i.e., into different directions) spectral lines. The angle at which each spectral line is observed can be chosen, by suitably selecting of the design parameters of the coherence filter. FIG. 13 illustrates the effect of such a filter by an example. Coherence filters of this kind can be useful when one searches for the presence of particular spectral lines. Conventional spectral filters are not so suitable for this purpose.

Next we consider the coherence properties of the light in the exit plane of such a coherence filter. On substituting from Eqs.(6.1) and (6.2) into Eq.(5.2) and performing the integration, we find that the spectral degree of coherence of light in that plane is given by the expression $$\mu^{(0)}(\rho_0, \rho'_0, \omega) = \exp\left[-i\frac{k}{f}\frac{\alpha}{\tan\phi}(\omega - \omega_0)(x'_0 - x_0)\right]\exp\left[-\frac{1}{4}\left(\frac{k}{f}\right)^2\sigma^2(x'_0 - x_0)^2\right], \quad (6.5)$$

where, as before, $k = \omega/c$. We stress that the spatial separation of the neighboring spectral lines is achieved by making use of the spatial coherence properties of the light in the exit plane, as indicated by Eq.(6.5).

Since coherence filters have different filtering properties in different directions of observation, they may also be useful in connection with optical signal processing, as for example, optical interconnects.

Optical interconnects are key elements for all-optical and opto-electronic computing systems, as noted in Yatagai, T., et. al., 1996 *Proc. IEEE* 84, 828. The direction-dependence of coherence filters embodying this invention provides for spectrum-selective optical interconnects in the sense that light with an arbitrary spectrum could be transmitted from a single node to any desired node of the network by the process of splitting the light in the so-called fan-out geometry in a splitter (FIG. 7B).

Coherence filters may be used in signal coding, especially for cryptography by utilizing a pupil mask such as, for example, that depicted in FIG. 14. This pupil mask is similar to the checkerboard, but the square elements of opaques and open areas are randomly distributed on the mask plane subject to the constraint indicated by Eq.(5.1). Encryption results are illustrated in FIG. 15 which shows that the filter functions are changed in a rather complicated manner, because of the random checkerboard-like pupil mask depending on the direction of observation. The complicated behavior in the spectrum provides a high level of encryption for cryptography, where methods of scrambling signals are sought for secure information storage and for secure communications.

Appendix A: Derivation of the Basic Eq.(4.1) for the Indebetouw System

In this Appendix we will examine the propagation of the cross-spectral density of light of arbitrary state of spatial coherence and derive an expression for the cross-spectral density of the light in the exit plane [i.e., the $(x_0, y_0)$-plane] of the Indebetouw system (see FIG. 8).

Consider polychromatic, spatially incoherent light having a two-dimensional intensity distribution $I^{(1)}(\rho) \equiv I^{(1)}(x, y)$ incident on a thin slit placed in the $(x_1, y_1)$-plane, as shown in FIG. 8. The cross-spectral density of the incident light in the input plane is, to a good approximation, given by the expression ([See Mandel, L. and Wolf, E., 1995, *Optical Coherence and Quantum Optics* (Cambridge University Press, Cambridge England], Sec.4.4.4)

$$W^{(1)}(\rho_1,\rho'_1,\omega) = S^{(1)}(\omega) I^{(1)}(\rho_1)^2 \delta[k(\rho_1-\rho'_1)], \quad (A1)$$

where $I^{(1)}(\rho_1)$ represents the intensity, $\rho_1 = (x_1, y_1)$ and $\rho'_1 = (x'_1, y'_1)$. Further $S^{(1)}(\omega)$ is the spectral density of the incident light which is implicitly assumed to be independent of position and $^2\delta$ is the two-dimensional Dirac delta function. Evidently, the cross-spectral density of the light in the slit aperture may be expressed in the form $$W^{(1)}(\rho_1,\rho'_1,\omega) = S^{(1)}(\omega)\, I^{(1)}(x_1)\delta(y_1)^2 \delta[k(\rho_1-\rho'_1)], \quad (A2)$$

where $I^{(1)}(x_1)$ represents the (one-dimensional) intensity distribution along the $x_1$-direction and $\delta$ denotes the (one-dimensional) Dirac delta function.

For the sake of simplicity, we consider the whole system depicted in FIG. 8 as being divided into three successive Fourier-transform systems, namely the portion from the $(x_1, y_1)$-plane to the $(x_2, y_2)$-plane, the portion from the $(x_2, y_2)$-plane to the $(x_3, y_3)$-plane, and finally the portion from the $(x_3, y_3)$-plane to the $(x_0, y_0)$-plane. The effects of the two prisms $P_1$ and $P_2$ and those of the pupil mask must, of course, be included in the analysis.

By making use of the relationship between the cross-spectral densities of the light in the front and the back focal planes of a lens (e.g., [Goodman, J. W., 1985, *Statistical Optics* (John Wiley & Sons, New York)], Sec.7.1.3), the cross-spectral density of light incident on the prism in the $(x_2, y_2)$-plane is given by the formula $$W^{(2)'}(\rho_2, \rho'_2, \omega) = \left(\frac{k}{2\pi f}\right)^2 \int\int W^{(1)}(\rho_1, \rho'_1, \omega)\exp\left[-i\frac{k}{f}(\rho'_1 \cdot \rho'_2 - \rho_1 \cdot \rho_2)\right] d^2\rho_1 d^2\rho'_1, \quad (A3)$$

with the effects of the prism $P_1$ being excluded. Here and in the following, the two-folded integrations are taken formally over the complete $\rho_1$ and $\rho'_1$ planes. Substituting from Eq. (A2) into Eq. (A3) and performing the integrations with respect to $y_1$, $x'_1$ and $y'_1$ and making use of properties of the Dirac delta function, we find that $$W^{(2)'}(\rho_2, \rho'_2, \omega) = \frac{1}{(2\pi f)^2} S^{(1)}(\omega) \int_{-\infty}^{\infty} I^{(1)}(x_1)\exp\left[-i\frac{k}{f}x_1(x'_2 - x_2)\right] dx_1. \quad (A4)$$

When the light is polychromatic, the prism $P_1$ located in the $(x_2, y_2)$-plane disperses the transmitted light and the angle of the dispersion is uniquely determined by the wavelength of the light. Such an optical element may be regarded as a frequency-dependent phase filter characterized by the transmission function $$\varphi(\rho_2, \omega) = \exp\left[i\frac{k}{f}\xi(\omega)y_2\right], \quad (A5)$$

where the frequency-dependent function $\xi(\omega)$ represents the effect of the dispersing element. The factor $k/f$ has been included in Eq. (A5) to simplify later analysis. The cross-spectral density of light in the $(x_2, y2)$-plane behind the prism becomes $$W^{(2)}(\rho_2,\rho'_2,\omega) = \phi(\rho_2,\omega)\phi(\rho'_2,\omega)W^{(2)'}(\rho_2,\rho'_2,\omega), \quad (A6)$$

where the asterisk denotes the complex conjugate. On substituting from Eqs. (A4) and (A5) into Eq. (A6), we find that $$W^{(2)}(\rho_2, \rho'_2, \omega) = \frac{1}{(2\pi f)^2} S^{(1)}(\omega) \exp\left[i\frac{k}{f}\xi(\omega)(y'_2 - y_2)\right]\int_{-\infty}^{\infty} I^{(1)}(x_1)\exp\left[-i\frac{k}{f}x_1(x'_2 - x_2)\right] dx_1. \quad (A7)$$

In a similar way as was done in deriving Eq.(A3), it follows that the cross-spectral density of light in the $(x_3, y_3)$-plane, in front of the pupil mask, may be expressed in the form $$W^{(3)}(\rho_3, \rho'_3, \omega) = \left(\frac{k}{2\pi f}\right)^2 \int\int W^{(2)}(\rho_2, \rho'_2, \omega)\exp\left[-i\frac{k}{f}(\rho'_2 \cdot \rho'_3 - \rho_2 \cdot \rho_3)\right] d^2\rho_2 d^2\rho'_2. \quad (A8)$$

Substituting from Eq. (A7) into Eq. (A8) and performing the integration, we readily obtain for $W^{(3)'}$ the expression $$W^{(3)'}(\rho_3, \rho'_3, \omega) = \frac{1}{k^2} S^{(1)}(\omega) I^{(1)}(-x_3)\delta(x'_3 - x_3)\delta[y_3 - \xi(\omega)]\delta[y'_3 - \xi(\omega)]. \quad (A9)$$

Equation (A9) indicates that in the $(x_3, y_3)$-plane along the $x_3$-direction, incoherent slit images are produced and that each slit image is shifted along the $y_3$-direction by the frequency-dependent amount of $\xi(\omega)$. Thus incoherent slit images are spectrally dispersed in the. $(x_3, y_3)$-plane along the $y_3$-direction.

Suppose now that the amplitude transmission function of the pupil mask, which is to be placed in the $(x_3, y_3)$-plane, is given by $T(\rho_3) \equiv T(x_3, y_3)$. Then the cross-spectral density of the light just behind the pupil mask is given by the expression $$W^{(3)}(\rho_3, \rho'_3, \omega) = T^*(\rho_3) T(\rho'_3) W^{(3)\prime}(\rho_3, \rho'_3, \mathbf{107}). \tag{A10}$$

The expression for the cross-spectral density of the light in the $(x_0, y_0)$-plane may be expressed, in the form of Eqs. (A3) and (A8) as $$W^{(0)\prime}(\rho_0, \rho'_0, \omega) = \tag{A11}$$

$$\left(\frac{k}{2\pi f}\right)^2 \int\int W^{(3)}(\rho_3, \rho'_3, \omega) \exp\left[-i\frac{k}{f}(\rho'_3 \cdot \rho'_0 - \rho_3 \cdot \rho_0)\right] d^2\rho_3 d^2\rho'_3,$$

when the effects of the second prism $P_2$ are omitted. The effects of the second prism may be included in a similar way as was done in connection with the first prism and one then obtains for the cross-spectral density of the light in the exit plane $(x_0, y_0)$ the expression $$W^{(0)}(\rho_0, \rho'_0, \omega) = \phi^*(\rho_0, \omega)\phi(\rho'_0, \omega) W^{(0)\prime}(\rho_0, \rho'_0, \omega). \tag{A12}$$

Since the second prism $P_2$ is assumed to be identical with the first prism, the function $\phi(\rho, \omega)$ is again given by Eq. (A5). On combining Eq. (A5) and Eqs. (A9)–(A12) one finds, after lengthy but straightforward calculation, that the cross-spectral density of the light in the exit plane is given by the expression $$W^{(0)}(\rho_0, \rho'_0, \omega) = \frac{1}{(2\pi f)^2} S^{(1)}(\omega) \tag{A13}$$

$$\int_{-\infty}^{\infty} |T(x_3, \xi(\omega))|^2 I^{(1)}(-x_3) \exp\left[-i\frac{k}{f}(x'_0 - x_0)x_3\right] dx_3.$$

Because the polychromatic intensity distribution along the slit in the input plane was assumed to be uniform, the function $I^{(1)}$ in the integrand of Eq. (A13) may be replaced by a constant value I and Eq. (A13) then reduces to $$W^{(0)}(\rho_0, \rho'_0, \omega) = \tag{A14}$$

$$\frac{I}{(2\pi f)^2} S^{(1)}\omega \int_{-\infty}^{\infty} |T(x_3, \xi(\omega))|^2 \exp\left[-i\frac{k}{f}(x'_0 - x_0)x_3\right] dx_3.$$

This is the basic equation (4.1) of the text.

Appendix B: Derivation of Eq.(5.7)

Consider a modified system in which the one-lens Fourier transform system is replaced by an achromatic Fourier transform system. In this Appendix we will derive an expression for the cross-spectral density of light in the exit plane $(x_0, y_0)$ of such a modified system of this kind.

According to Eq. (A 10), the cross-spectral density of light just behind the pupil mask is given by the expression $$W^{(3)}(\rho_3, \rho'_3, \omega) = T^*(\rho_3) T(\rho'_3) W^{(3)\prime}(\rho_3, \rho'_3, \omega). \tag{B1}$$

With spatially coherent light, the achromatic Fourier transform system produces a Fourier transform pattern whose size is independent of frequency (or, equivalently, of the wavelength) of the light For this case the cross-spectral density of the light in the $(x_0, y_0)$-plane after it has then transmitted through the achromatic Fourier transform system is no longer given by Eq. (A11) but rather by the expression [see Morris, G. M., Zweig, D. A., 1987, in *Optical Signal Processing*, ed. J. L. Homer (Academic Press: New York), 23–71.]

$$W^{(0)\prime}(\rho_0, \rho'_0, \omega) = \tag{B2}$$

$$\left(\frac{k_0}{2\pi f}\right)^2 \int\int W^{(3)}(\rho_3, \rho'_3, \omega) \exp\left[-i\frac{k_0}{f}(\rho'_3 \cdot \rho'_0 - \rho_3 \cdot \rho_0)\right] d^2\rho_3 d^2\rho'_3,$$

where $k_0 = \omega_0/c$ is a positive constant representing the wave number associated with a particular design frequency $\omega_0$, c being the speed of light in vacuum. The effects of the prism $P_2$ located just in front of the $(x_0, y_0)$-plane may be taken into account by the use of the expression (A12), viz., $$W^{(0)}(\rho_0, \rho'_0, \omega) = \phi^*(\rho_0, \omega)\phi(\rho'_0, \omega) W^{(0)\prime}(\rho_0, \rho'_0, \omega), \tag{B3}$$

where $\phi$ is given by Eq. (A5). Substituting from Eq. (B1) and Eq. (A9) into Eq. (B2) and making use of Eq. (B3), we find that $$W^{(0)\prime}(\rho_0, \rho'_0, \omega) = \left(\frac{\omega_0}{2\pi f}\right)^2 \frac{1}{\omega^2} S^{(1)}(\omega) \exp\left[i\frac{1}{f}(k - k_0)\xi(\omega)(y'_0 - y_0)\right] \times \tag{B4}$$

$$\int_{-\infty}^{\infty} |T(x_3, \xi(\omega))|^2 I^{(1)}(-x_3) \exp\left[-i\frac{k_0}{f}(x'_0 - x_0)x_3\right] dx_3.$$

As in Appendix A, we assume that the intensity distribution along the slit in the input plane is uniform. We may then again replace the function $I^{(1)}(x)$ by a constant I. Further, the values of $y_0$ and $y'_0$ in Eq.(B4) may be replaced by zero without loss of generality, because of the presence of the slit aperture along the line at $y_0 = 0$ in the output plane. Equation (B4) then reduces to $$W^{(0)\prime}(\rho_0, \rho'_0, \omega) = \tag{B5}$$

$$I\left(\frac{\omega_0}{2\pi f}\right)^2 \frac{1}{\omega^2} S^{(1)}(\omega) \int_{-\infty}^{\infty} |T(x_3, \xi(\omega))|^2 \exp\left[-i\frac{k_0}{f}(x'_0 - x_0)x_3\right] dx_3,$$

which is the formula (5.7) given in the text.

What is claimed is:

1. A system utilizing optical radiation which comprises a source of optical radiation propagating along a path, a spatial filter having a spatial coherence controller in the path of said optical radiation which transmits said radiation therethrough essentially without altering the spectral density thereof as it passes through the system whereby to filter said radiation.

2. A system for filtering of radiation from a source of broadband radiation operative by modifying the spatial coherence of the radiation which comprises a transmission controller via which said radiation propagates to a location where said radiation is filtered spectrally as a function of the spatial coherence thereof which system, said controller having (a) an entrance and an exit for said radiation, (b) means for changing the spatial spectral coherence of said radiation in accordance with said function and (c) means in said coherence changing means operative on said radiation such that the spectral density of said radiation at said exit is essentially unchanged from the spectral density of said radiation at said entrance.

3. The system of claim 2 wherein said radiation is electromagnetic radiation.

4. The system of claim 3 wherein said electromagnetic radiation is optical radiation which contains visible radiation.

5. The system of claim 2 wherein said location is in the far field or Fraunhoffer region with respect to said exit.

6. The system of claim 2 further comprising transform means in the path of radiation from said exit to said location for setting the distance from said exit to said location.

7. The system of claim 6 wherein said radiation is optical radiation and said transform means is provided by at least one lens.

8. The system of claim 2 wherein said source provides incoherent radiation.

9. The system of claim 2 further comprising means for randomizing radiation from said source to render it spatially incoherent.

10. The system of claim 9 wherein said source is at the objective of an optical instrument and said randomizing means is an optical scatterer.

11. The system of claim 10 wherein said optical scatterer is a rotating ground class element.

12. The system of claim 2 wherein said spatial spectral coherence changing mean comprises means for spectrally dispersing said radiation over a spatial region, means for combining the spatially dispersed spectrum of said radiation, and means between said dispersing and said combining means for changing the spectral dispersion of said radiation in accordance with said function,without essentially changing the spectral density of said radiation, thereby also providing said means operative upon said radiation.

13. The system of claim 12 wherein said region extends over a plane and said, spectral coherence changing means is a mask having an aperture therein which geometrically satisfies said function.

14. The system of claim 13 wherein the width of said aperture is in one of two orthogonal directions and is essentially constant.

15. The system according to claim 13 further comprising means for changing the shape of said aperture in accordance with information carried by said radiation to carry out a computational process.

16. The system of claim 15 wherein said computational process is encryption.

17. The system of claim 12 wherein said spectral dispersing means includes a dispersing element.

18. The system of claim 17 wherein said dispersing element is at least one prism.

19. The system of claim 12 wherein said location is defined by an observation plane.

20. The system of claim 19 wherein a spatial optical splitter is disposed in said observation plane.

21. The system of claim 12 wherein said combining means includes means for Fourier transformation of said radiation.

22. The system of claim 12 wherein said exit is defined by an aperture which provides a secondary source of said radiation.

23. The system according to claim 2 wherein said function varies in accordance with the angle of observation from different spatial positions at said location to an axis from said controller to said location.

24. The system according to claim 22 further comprising encryption means for changing said function in accordance with information to be carried by said radiation thereby changes said positions and decryption means operative upon the changes in said positions.

25. The system of claim 2 further comprising digital control means for operating said spatial coherence changing means to encode said radiation at said location.

26. A spatial coherence spectral filter system comprising means for applying electromagnetic energy having a spectrum $S^{(0)}$ to an electromagnetic energy transmission control element, including means presenting a function $F(\omega;r,s)$ which changes a spectrum $S^{(\infty)}(r,s,\omega)$ in a far-zone spaced from the source, without changing the spectrum of the energy on transmission through the system itself.

27. The filter of claim 26 where the effect is on the Fourier transform in at least two dimensions of the energy from the source.

28. The filter of claims 27 where the Fourier transform is $\tilde{g}^{(0)}$, is defined as follows $$F(\omega; r, s) = \frac{A\omega^2}{c^2 r^2} \tilde{g}^{(0)}(ks_\perp)\cos^2\theta\omega.$$

where A is the area of the source domain, $\omega$ is the frequency, c is the speed of light, r is the distance from the source domain (origin) to a point P in the far zone, s is the unit vector, $s_\perp$ is the projection, as a two-dimensional vector, of the unit vector s onto the source plane, $\theta$ is the angle which the unit vector s makes with the positive z-direction, and $k=\omega/c$.

29. The filter of claim 28 wherein a mask and Fourier transform element implement said means presenting said Fourier transform.

30. The filter of claim 29 wherein said mask presents a Besinc function.

31. The filter of claim 30 wherein said mask has a non-circular aperture through which the energy passes to said Fourier transform presenting means.

32. The filter of claim 29 wherein said mask has a transmission function T(x, y) which has a constant value C where $$\int_{-\infty}^{\infty} |T(x, y)|^2 dx = C,$$

33. The filter of claim 27 where the Fourier transform is provided by an achromatic Fourier transform system.

* * * * *

UNITED STATES PATENT AND TRADEMARK OFFICE
CERTIFICATE OF CORRECTION

PATENT NO. : 6,226,113 B1 Page 1 of 1
DATED : May 1, 2001
INVENTOR(S) : Emil Wolf It is certified that error appears in the above-identified patent and that said Letters Patent is hereby corrected as shown below:

Column 1,
Line 3, under the title, insert the following paragraph:

-- The U.S. Government may have rights in this patent pursuant to one or both of the following contracts between The University of Rochester and the US Air Force Office of Scientific Research under grant No. F49620-96-1-0400, and/or the US Department of Energy under grant No. DE-FG02-90ER 14119. --

Signed and Sealed this

Fifteenth Day of June, 2004

JON W. DUDAS
*Acting Director of the United States Patent and Trademark Office*